United States Patent
Lee et al.

(10) Patent No.: US 9,667,394 B2
(45) Date of Patent: May 30, 2017

(54) PROTECTION METHODS FOR WIRELESS TRANSMISSIONS

(71) Applicant: NEWRACOM, INC., Irvine, CA (US)

(72) Inventors: Dae Won Lee, Irvine, CA (US); Young Hoon Kwon, Irvine, CA (US); Yujin Noh, Irvine, CA (US); Sungho Moon, Irvine, CA (US); Ahmad Reza Hedayat, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 15/291,947

(22) Filed: Oct. 12, 2016

(65) Prior Publication Data

US 2017/0104563 A1 Apr. 13, 2017

Related U.S. Application Data

(60) Provisional application No. 62/240,419, filed on Oct. 12, 2015, provisional application No. 62/331,380, (Continued)

(51) Int. Cl.
*H04L 5/00* (2006.01)
*H04W 72/12* (2009.01)
(Continued)

(52) U.S. Cl.
CPC ......... *H04L 5/0044* (2013.01); *H04W 72/121* (2013.01); *H04W 74/0816* (2013.01); *H04L 5/0007* (2013.01); *H04W 84/12* (2013.01)

(58) Field of Classification Search
None
See application file for complete search history.

(56) References Cited

U.S. PATENT DOCUMENTS

| 7,864,796 B1* | 1/2011 | Benveniste | H04W 28/26 370/230 |
| 2009/0136034 A1 | 5/2009 | Gaal et al. | |

(Continued)

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Andrew Lai
*Assistant Examiner* — Jamaal Henson

(57) ABSTRACT

A wireless device receives a Multi-User Request-To-Send (MU-RTS) frame, descrambles first scrambled data in the MU-RTS frame using a first scrambling sequence, generates second scrambled data using a second scrambling sequence, and transmits a Clear-to-Send (CTS) frame including the second scrambled data in response to receiving the MU-RTS frame. The second scrambling sequence is an N-bit left cyclic shift of the first scrambling sequence. Another wireless device generates first scrambled data using a first scrambling sequence and transmits an MU-RTS frame including the first scrambled data. The wireless device receives a CTS frame transmitted in response to the MU-RTS frame, and descrambles second scrambled data in the CTS frame using a second scrambling sequence. The second scrambling sequence is an N-bit left cyclic shift of the first scrambling sequence. In either device, N may be 7, and lengths of the first and second scrambling sequences may be 127 bits.

20 Claims, 12 Drawing Sheets

Related U.S. Application Data filed on May 3, 2016, provisional application No. 62/333,077, filed on May 6, 2016, provisional application No. 62/333,192, filed on May 7, 2016.

(51) Int. Cl.
*H04W 74/08* (2009.01)
*H04W 84/12* (2009.01)

(56) References Cited

U.S. PATENT DOCUMENTS

| | | | |
|---|---|---|---|
| 2011/0150004 A1* | 6/2011 | Denteneer | H04L 5/0023 370/476 |
| 2011/0194644 A1* | 8/2011 | Liu | H04L 5/0023 375/295 |
| 2011/0317630 A1* | 12/2011 | Zhu | H04W 74/0816 370/329 |
| 2012/0147804 A1* | 6/2012 | Hedayat | H04W 74/0816 370/312 |
| 2014/0029543 A1 | 1/2014 | Fischer et al. | |
| 2014/0334476 A1 | 11/2014 | Cheong et al. | |

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronica Engineers, Inc.), New York, NY USA.

International Search Report for PCT/US16/56651, dated Feb. 16, 2017.

\* cited by examiner

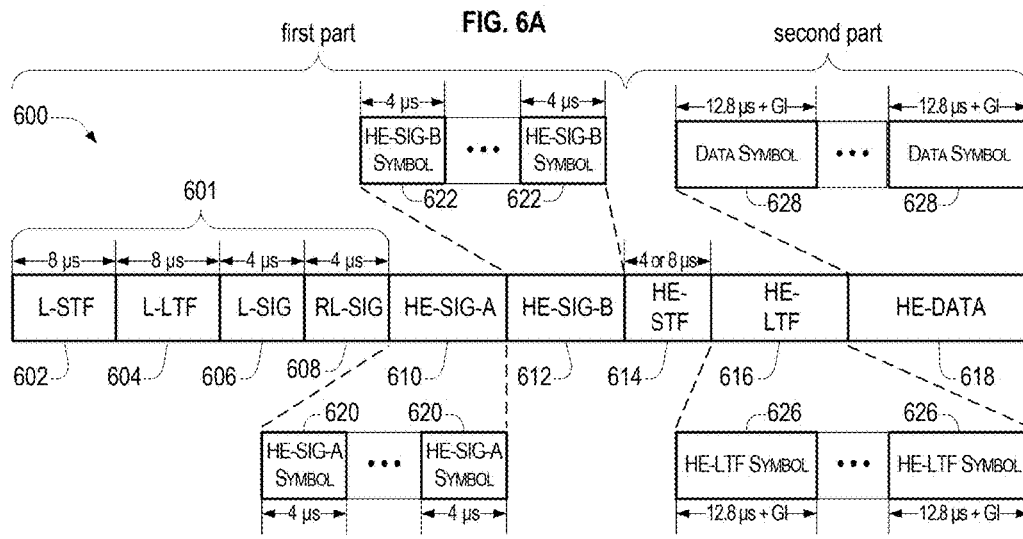

Table 1:

| Element | definition | duration | DFT period | GI | Subcarrier spacing |
|---|---|---|---|---|---|
| Legacy (L)-STF | Non-HT Short Training field | 8 μs | - | - | equiv. to 1,250 kHz |
| L-LTF | Non-HT Long Training field | 8 μs | 3.2 μs | 1.6 μs | 312.5 kHz |
| L-SIG | Non-HT Signal field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| HE-SIG-A | HE SIGNAL A field | $N_{HESIGA} * 4$ μs | 3.2 μs | 0.8 μs | 312.5 kHz |
| HE-SIG-B | HE SIGNAL B field | $N_{HESIGB} * 4$ μs | 3.2 μs | 0.8 μs | 312.5 kHz |
| HE-STF | HE Short Training field | 4 or 8 μs | - | - | • non-trigger-based PPDU: (equiv. to) 1,250 kHz; • trigger-based PPDU: (equiv. to) 625 kHz |
| HE-LTF | HE Long Training field | $N_{HELTF} *$ (DFT period + GI)μs | 2xLTF: 6.4 μs 4xLTF: 12.8 μs | supports 0.8, 1.6, 3.2 μs | • 2xLTF: (equiv. to) 156.25 kHz; • 4xLTF: 78.125 kHz |
| HE-DATA | HE DATA field | $N_{DATA} *$ (DFT period + GI)μs | 12.8 μs | supports 0.8, 1.6, 3.2 μs | 78.125 kHz |

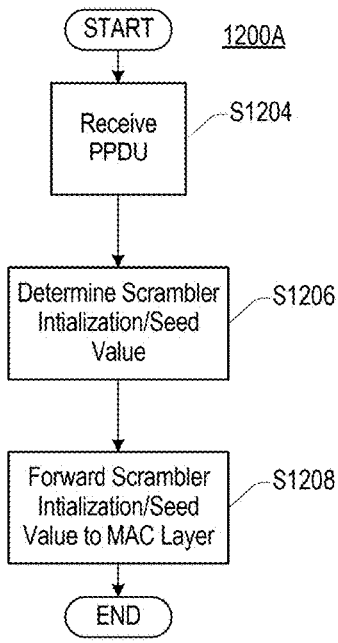

FIG. 12A

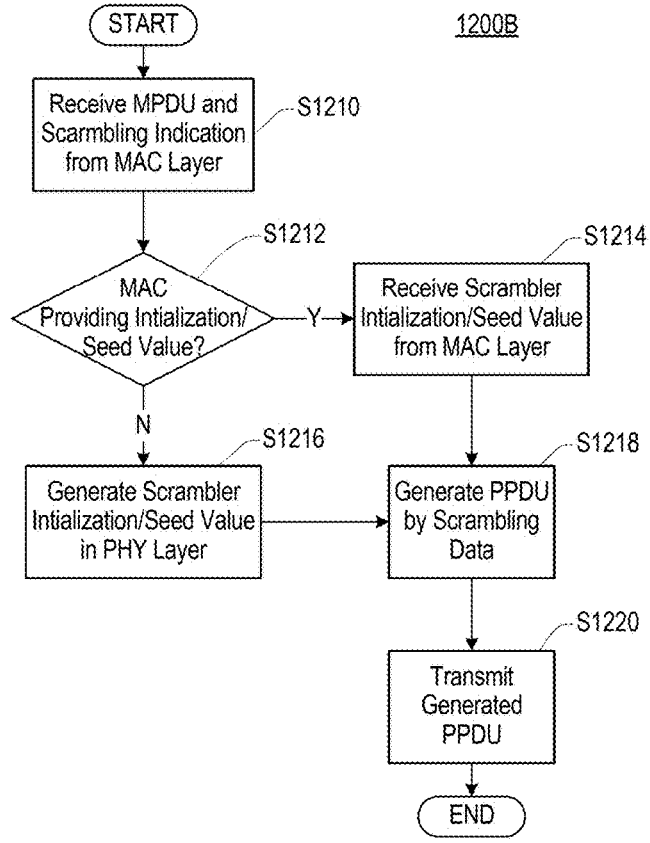

FIG. 12B

FIG. 13
Table 2

| Parameter | Condition | Value | TXVECTOR | RXVECTOR |
|---|---|---|---|---|
| ⋮ | ⋮ | ⋮ | ⋮ | ⋮ |
| SCRAMBLER_ INTIALIZATION | FORMAT is NON_HT | In RXVECTOR, indicates the scrambler initialization value of the received PPDU. In TXVECTOR, if present, indicates the scrambler initialization value of the transmitted PPDU. | Y | Y |
| | Otherwise | Indicates the scrambler initialization value of the received PPDU. | N | Y (or MU) |
| ⋮ | ⋮ | ⋮ | ⋮ | ⋮ |

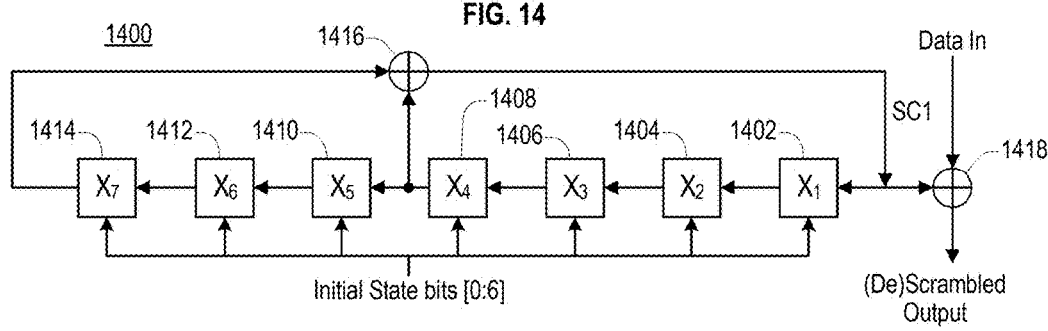
FIG. 14
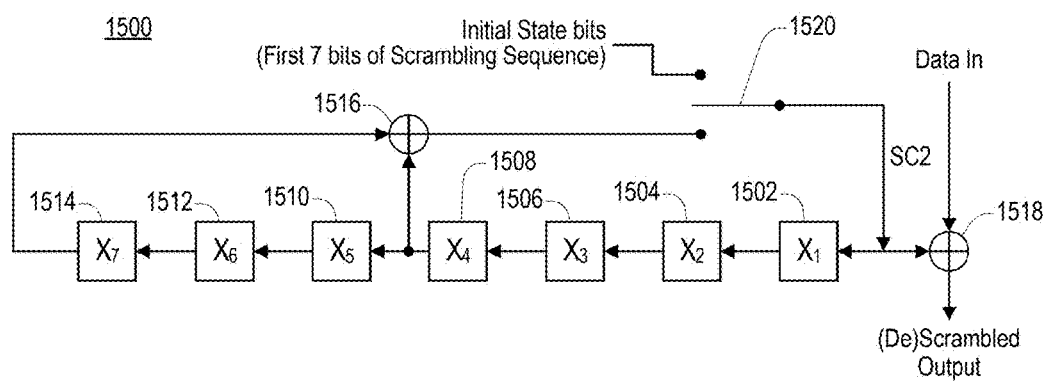
FIG. 15
FIG. 16
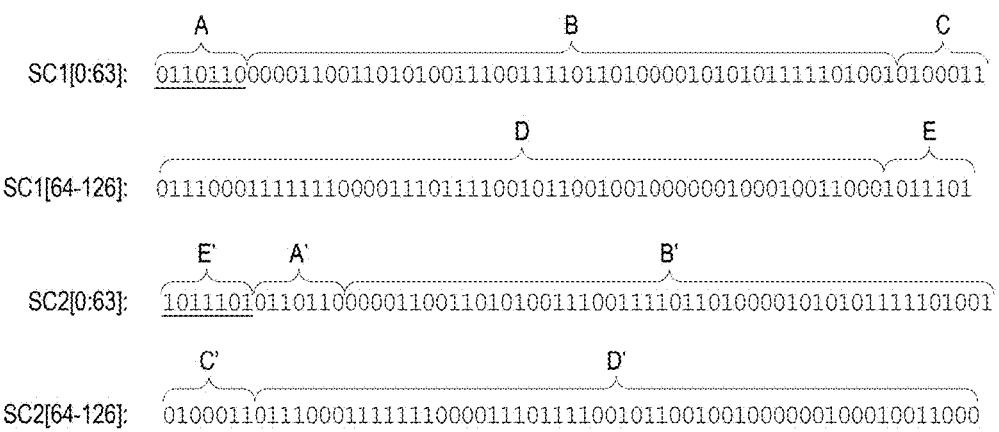

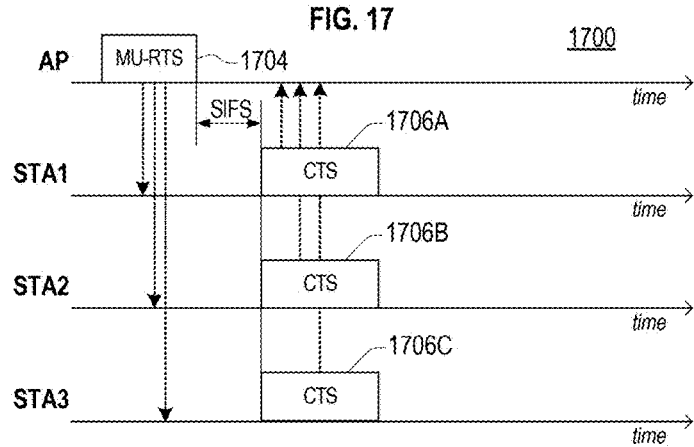
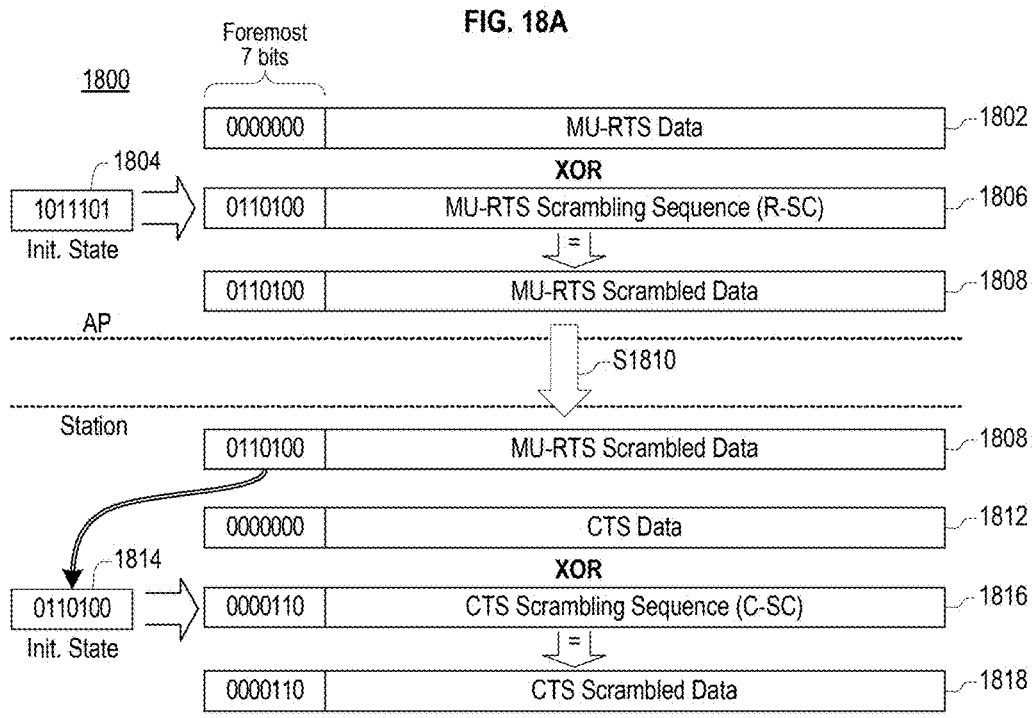

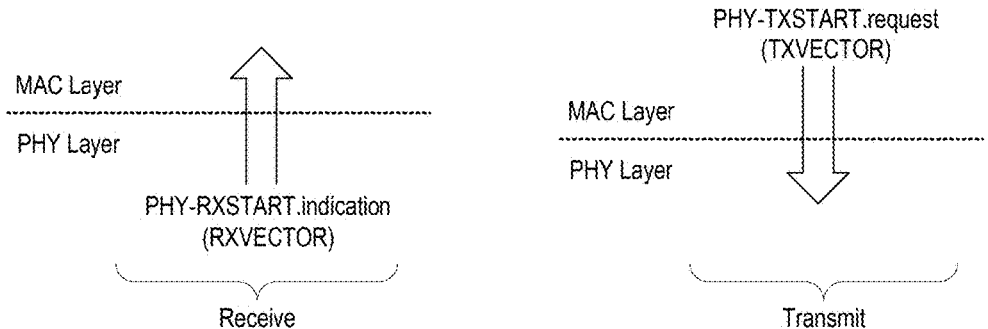

Table 3

| Parameter | Associated Primitive | Value |
|---|---|---|
| LENGTH | PHY-TXSTART.request (TXVECTOR) | 1-4095 |
| DATATRATE | PHY-TXSTART.request (TXVECTOR) | 6, 9, 12, 18, 24, 36, 48, and 54 Mb/s for 20 MHz channel spacing (Support of 6, 12, and 24 Mb/s data rates is mandatory.) 3, 4.5, 6, 9, 12, 18, 24, and 27 Mb/s for 10 MHz channel spacing (Support of 3, 6, and 12 Mb/s data rates is mandatory.) 1.5, 2.25, 3, 4.5, 6, 9, 12, and 13.5 Mb/s for 5 MHz channel spacing (Support of 1.5, 3, and 6 Mb/s data rates is mandatory.) |
| SERVICE | PHY-TXSTART.request (TXVECTOR) | Null |
| TXPWR_LEVEL_INDEX | PHY-TXSTART.request (TXVECTOR) | 1-8 |
| TIME_OF_DEPARTURE_ REQUESTED | PHY-TXSTART.request (TXVECTOR) | false, true. When true, the MAC entity requests that the PHY entity measures and reports time of departure parameters corresponding to the time when the first frame energy is sent by the transmitting port; when false, the MAC entity requests that the PHY entity neither measures nor reports time of departure parameters. |
| CH_BANDWIDTH_ IN_NON_HT | PHY-TXSTART.request (TXVECTOR) | If present, CBW20, CBW40, CBW80, CBW160, or CBW80+80 |
| DYN_BANDWIDTH_ IN_NON_HT | PHY-TXSTART.request (TXVECTOR) | If present, Static or Dynamic |
| SCRAMBLER_INITIAL_STATE | PHY-TXSTART.request (TXVECTOR) | 7 bit non-zero value |

FIG. 21

Table 4

| Parameter | Associated Primitive | Value |
|---|---|---|
| LENGTH | PHYRXSTART.indication (RXVECTOR) | 1-4095 |
| RSSI | PHYRXSTART.indication (RXVECTOR) | 0-RSSI maximum |
| DATATRATE | PHYRXSTART.request (RXVECTOR) | 6, 9, 12, 18, 24, 36, 48, and 54 Mb/s for 20 MHz channel spacing (Support of 6, 12, and 24 Mb/s data rates is mandatory.) 3, 4.5, 6, 9, 12, 18, 24, and 27 Mb/s for 10 MHz channel spacing (Support of 3, 6, and 12 Mb/s data rates is mandatory.) 1.5, 2.25, 3, 4.5, 6, 9, 12, and 13.5 Mb/s for 5 MHz channel spacing (Support of 1.5, 3, and 6 Mb/s data rates is mandatory.) |
| SERVICE | PHYRXSTART.indication (RXVECTOR) | Null |
| RCPI (Parameter is present only when dot11RadioMeasurementActivated is true.) | PHYRXSTART.indication (RXVECTOR) PHY-RXEND.indication (RXVECTOR) | 0-255 |
| ANT_STATE (Parameter is present only when dot11RadioMeasurementActivated is true.) | PHYRXSTART.indication (RXVECTOR) PHY-RXEND.indication (RXVECTOR) | 0-255 |
| RX_START_OF_FRAME_OFFSET | PHY-RXSTART.indication (RXVECTOR) | 0 to $2^{32}-1$. An estimate of the offset (in 10 ns units) from the point in time at which the start of the preamble corresponding to the incoming frame arrived at the receive antenna connector to the point in time at which this primitive is issued to the MAC. |
| CH_BANDWIDTH_IN_NON_HT | PHY-RXSTART.request (RXVECTOR) | If present, CBW20, CBW40, CBW80, CBW160, or CBW80+80 |
| DYN_BANDWIDTH_IN_NON_HT | PHY-RXSTART.request (RXVECTOR) | If present, Static or Dynamic |
| SCRAMBLER_INITIALIZATION | PHY-RXSTART.request (RXVECTOR) | The scrambler initialization subfield of the SERVICE field prior to descrambling. |

FIG. 22

Table 5

| Parameter | Associated Primitive | Value |
|---|---|---|
| LENGTH | PHYRXSTART. indication (RXVECTOR) | 1–4095 |
| RSSI | PHYRXSTART. indication (RXVECTOR) | 0–RSSI maximum |
| DATATRATE | PHYRXSTART. request (RXVECTOR) | 6, 9, 12, 18, 24, 36, 48, and 54 Mb/s for 20 MHz channel spacing (Support of 6, 12, and 24 Mb/s data rates is mandatory.) 3, 4.5, 6, 9, 12, 18, 24, and 27 Mb/s for 10 MHz channel spacing (Support of 3, 6, and 12 Mb/s data rates is mandatory.) 1.5, 2.25, 3, 4.5, 6, 9, 12, and 13.5 Mb/s for 5 MHz channel spacing (Support of 1.5, 3, and 6 Mb/s data rates is mandatory.) |
| SERVICE | PHYRXSTART. indication (RXVECTOR) | The scrambler initialization subfield of the SERVICE field prior to descrambling. |
| RCPI (Parameter is present only when dot11RadioMeasurementActivated is true.) | PHYRXSTART. indication (RXVECTOR) PHY-RXEND.indication (RXVECTOR) | 0-255 |
| ANT_STATE (Parameter is present only when dot11RadioMeasurementActivated is true.) | PHYRXSTART. indication (RXVECTOR) PHY-RXEND.indication (RXVECTOR) | 0-255 |
| RX_START_OF_ FRAME_OFFSET | PHY-RXSTART. indication (RXVECTOR) | 0 to $2^{32}-1$. An estimate of the offset (in 10 ns units) from the point in time at which the start of the preamble corresponding to the incoming frame arrived at the receive antenna connector to the point in time at which this primitive is issued to the MAC. |
| CH_BANDWIDTH_ IN_NON_HT | PHY-RXSTART.request (RXVECTOR) | If present, CBW20, CBW40, CBW80, CBW160, or CBW80+80 |
| DYN_BANDWIDTH _IN_NON_HT | PHY-RXSTART.request (RXVECTOR) | If present, Static or Dynamic |

PROTECTION METHODS FOR WIRELESS TRANSMISSIONS

CROSS-REFERENCE TO RELATED APPLICATION

This application claims the benefit of U.S. Provisional Patent Application No. 62/240,419, filed Oct. 12, 2015, U.S. Provisional Patent Application No. 62/331,380, filed May 3, 2016, U.S. Provisional Patent Application No. 62/333,077, filed May 6, 2016, and U.S. Provisional Patent Application 62/333,192, filed May 7, 2016, which are incorporated by reference herein in their entireties.

BACKGROUND

1. Technical Field

The technology described herein relates generally to wireless networking. More particularly, the technology relates to Multi-User Multiple-Input-Multiple-Output (MU-MIMO) and Orthogonal Frequency Division Multiple Access (OFDMA) communications in a wireless network.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

An HE WLAN supports Down-Link (DL) and Up-Link (UL) Multi-User (MU) transmissions such as MU Orthogonal Frequency Division Multiple Access (MU OFDMA) transmission, Multi-User Multi-Input-Multi-Output (MU MIMO) transmissions, and MU transmissions that use both OFDMA and MU-MIMO. Collectively, transmissions using OFDMA, MU-MIMO, or both are referred to herein as MU transmissions.

MU communication as define herein are distinguished from other transmissions, such as broadcast transmissions, by the allocation in the MU communication of only a portion of the channel (such as a sub-channel in an OFDMA communication, one or more spatial streams in an MU-MIMO communication, or one or more spatial streams of a sub-channel in a communication using both OFDMA and MU-MIMO) to a particular communication.

Sounding operations are used to identify channel conditions in a wireless network. Identifying the channel conditions permits better utilization of the channel by enabling one or more of higher bit rates, use of a greater number of spatial streams, and more effective utilization of transmission power. However, sounding operations may contribute to the total amount of overhead in a wireless network. Therefore it is advantageous for sounding processes, including sounding processes used for UL MU transmissions, to be efficient.

Protection mechanisms are used in wireless networks to prevent one station's transmissions from interfering with another station's transmissions. For example, a wireless network may use Clear-To-Send (CTS) and Ready-To-Send (RTS) packets to reserve a channel for a particular communication. When MU transmissions are being performed, including cascaded MU transmissions, such protection mechanisms should be efficient in order to increase the effective throughput of the wireless network.

A wireless network performing MU communications may Radio-Frequency (RF) combine all or portions of MU transmissions in the network. RF combining occurs when a plurality of stations simultaneous transmit respective transmissions into a channel, and the transmissions combine in the channel to form a single received transmission, The wireless network may apply scrambling sequences to information being transmitted in order to prevent the transmission of signal patterns which might result in an unwanted regularity in the transmitted signal. When a wireless network uses scrambling sequences, for two or more transmissions to be successfully RF-combined, all of the two or more transmissions must use a same scrambling sequence.

SUMMARY

In an embodiment, a method performed by a wireless device comprises receiving a Multi-User Request-To-Send (MU-RTS) frame including first scrambled data, descrambling the first scrambled data included in the MU-RTS frame using a first scrambling sequence, generating second scrambled data by scrambling data for a CTS frame using a second scrambling sequence, and transmitting the CTS frame in response to receiving the MU-RTS frame. The CTS frame includes the second scrambled data. For each $i^{th}$ bit SS[i] of the second scrambling sequence, i=0 . . . M−1, SS[i] is equal to FS[(i+K) modulo L], where FS[j] is a $j^{th}$ bit of the first scrambling sequence, K being a fixed integer greater than 1, M being an integer greater than 1, and L being equal to 2 to the $K^{th}$ power minus 1.

In an embodiment, the MU-RTS frame further includes first data immediately followed by the first scrambled data, and the method further comprises generating the first scrambling sequence based on the first data.

In an embodiment, a size of the first data is equal to 7 bits.

In an embodiment, the CTS frame further includes second data immediately followed by the second scrambled data, and the second data is equal to foremost 7 bits of the first scrambling sequence.

In an embodiment, K is equal to 7.

In an embodiment, M is equal to a size of the second scrambled data.

In an embodiment, the MU-RTS frame further includes first data immediately followed by the first scrambled data, and the method further comprises generating the second scrambling sequence based on the first data.

In an embodiment, generating the second scrambling sequence comprises generating the second scrambling sequence by using the first data as an initial state of a scrambler for scrambling the data for the CTS frame.

In an embodiment, the method further comprises providing, by a PHY layer of the wireless device, the first data to a MAC layer of the wireless device.

In an embodiment, generating the second scrambling sequence comprises i) determining, by the PHY layer of the wireless device, whether the PHY layer receives an initial state value from the MAC layer of the wireless device, and ii) generating, by the PHY layer of the wireless device, the second scrambling sequence by using the initial state value as the initial state of a scrambler, in response to determining that the PHY layer receives the initial state value from the MAC layer of the wireless device.

In an embodiment, generating the second scrambling sequence further comprises generating, by the PHY layer of the wireless device, the initial state value, in response to determining that the PHY layer does not receive the initial state value from the MAC layer of the wireless device.

In an embodiment, the method further comprises receiving, by the PHY layer of the wireless device, the initial state value from the MAC layer of the wireless device as a parameter of a TXVECTOR.

In an embodiment, the method further comprises providing, by a PHY layer of the wireless device, the first data to the MAC layer of the wireless device as a parameter of an RXVECTOR.

In an embodiment, the first data correspond to a value of a scrambler initialization field in a Service field of the received MU-RTS frame prior to descrambling.

In an embodiment, a method performed by a wireless device comprises generating first scrambled data by scrambling data for a Multi-User Request-To-Send (MU-RTS) frame using a first scrambling sequence, transmitting the MU-RTS frame, the MU-RTS frame including the first scrambled data, receiving a CTS frame transmitted in response to the MU-RTS frame, and descrambling second scrambled data included in the CTS frame using a second scrambling sequence. For each $i^{th}$ bit SS[i] of the second scrambling sequence, i=0 . . . M−1, SS[i] is equal to FS[((i+K) modulo L)], where FS[j] is a $j^{th}$ bit of the first scrambling sequence, K being a fixed integer greater than 1, M being an integer greater than 1, and L being equal to 2 to the $K^{th}$ power minus 1.

In an embodiment, the MU-RTS frame further includes first data immediately followed by the first scrambled data.

In an embodiment, a size of the first data is equal to 7 bits.

In an embodiment, the method further comprises generating the second scrambling sequence based on the first data.

In an embodiment, the CTS frame further includes second data immediately followed by the second scrambled data, and the second data is equal to foremost 7 bits of the first scrambling sequence.

In an embodiment, K is equal to 7.

In an embodiment, a method performed by a wireless device comprises receiving a Null Data Packet Announcement (NDPA). The NDPA includes one or more station information fields. The method further comprises determining a number of the one or more station information fields in the NDPA, receiving a Null Data Packet (NDP), and when the number of one or more station information fields in the NDPA is one, transmitting first Channel State Information (CSI) feedback in response to receiving the NDP.

In an embodiment, the method further comprises when the number of one or more station information fields in the NDPA is greater than one, receiving a first trigger frame and transmitting the first CSI feedback in response to receiving the first trigger frame.

In an embodiment, transmitting the first CSI feedback in response to receiving the NDP comprises transmitting the first CSI feedback a first predetermined interframe space (IFS) after receiving the NDP.

In an embodiment, transmitting the first CSI feedback in response to receiving the first trigger frame comprises transmitting the first CSI feedback a second predetermined IFS after receiving the first trigger frame.

In an embodiment, transmitting the first CSI feedback in response to receiving the NDP comprises transmitting the first CSI feedback in a single user transmission in response to receiving the NDP.

In an embodiment, transmitting the first CSI feedback in response to receiving the first trigger frame comprises transmitting the first CSI feedback in a multi user transmission in response to receiving the first trigger frame.

In an embodiment, the first trigger frame comprises a resource assignment information.

In an embodiment, transmitting the first CSI feedback in a multi user transmission comprises participating the multi user transmission based on the resource assignment information to transmit the first CSI feedback in response to receiving the first trigger frame.

In an embodiment, the method further comprises when the number of one or more station information fields in the NDPA is greater than one, receiving a second trigger frame and transmitting second CSI feedback in response to receiving the second trigger frame.

In an embodiment, the method further comprises receiving a sounding poll frame, and transmitting the first CSI feedback in response to receiving the sounding poll frame.

In an embodiment, a method performed by a wireless device comprises transmitting a Null Data Packet Announcement (NDPA). The NDPA including one or more station information fields. The method further comprises transmitting a Null Data Packet (NDP), and when a number of one or more station information fields in the NDPA is one, receiving first Channel State Information (CSI) feedback in response to transmitting the NDP.

In an embodiment, the method further comprises when the number of one or more station information fields in the NDPA is greater than one, transmitting a first trigger frame and receiving the first CSI feedback in response to transmitting the first trigger frame.

In an embodiment, receiving the first CSI feedback in response to transmitting the NDP comprises receiving the first CSI feedback a first predetermined interframe space (IFS) after transmitting the NDP.

In an embodiment, receiving the first CSI feedback in response to transmitting the first trigger frame comprises receiving the first CSI feedback a second predetermined IFS after transmitting the first trigger frame.

In an embodiment, receiving the first CSI feedback in response to transmitting the NDP comprises receiving the first CSI feedback in a single user transmission in response to transmitting the NDP.

In an embodiment, receiving the first CSI feedback in response to transmitting the first trigger frame comprises receiving the first CSI feedback in a multi user transmission in response to transmitting the first trigger frame.

In an embodiment, the first trigger frame comprises a resource assignment information.

In an embodiment, receiving the first CSI feedback in a multi user transmission comprises participating in the multi user transmission based on the resource assignment information to receive the first CSI feedback in response to transmitting the first trigger frame.

In an embodiment, the method further comprises when the number of one or more station information fields in the NDPA is greater than one transmitting a second trigger frame and receiving second CSI feedback in response to transmitting the second trigger frame.

In an embodiment, the method further comprises transmitting a sounding poll frame and receiving the first CSI feedback as a response to transmitting the sounding poll frame.

BRIEF DESCRIPTION OF THE DRAWINGS

FIG. 6A illustrates an HE Physical Layer Convergence Protocol (PLCP) Protocol Data Units (PPDU), according to an embodiment.

FIG. 6B shows a Table 1 disclosing additional properties of fields of the HE PPDU frame of FIG. 6A, according to an embodiment.

FIG. 12A illustrates a process for determining and saving a scrambler initialization (or seed value) from a received PPDU, according to an embodiment.

FIG. 12B illustrates a process for using a scrambler initialization (or seed value) received from a MAC layer to scramble and transmit a PPDU, according to an embodiment.

FIG. 13 illustrates shows a Table 2 illustrating information in a TXVECTOR and an RXVECTOR, according to an embodiment.

FIG. 14 illustrates a circuit for performing the first scrambling operation, according to an embodiment.

FIG. 15 illustrates a circuit for performing the second scrambling operation, according to an embodiment.

FIG. 16 shows scrambling sequences generated by the first and second scrambling operations, according to an embodiment.

FIG. 17 illustrates a Multi-User Request-To-Send/Clear-To-Send (RTS/CTS) exchange process, according to an embodiment.

FIG. 18A illustrates a process for scrambling data of a CTS frame, according to an embodiment.

FIG. 18B shows illustrative 127-bit cycles of RTS and CTS scrambling sequences used in the process of FIG. 18A, according to an embodiment.

FIG. 19 illustrates flows of information between a PHY layer and a MAC layer of a wireless device, according to an embodiment.

FIG. 20 shows a Table 3 of TXVECTOR parameters, according to an embodiment.

FIG. 21 shows a Table 4 of RXVECTOR parameters for non-High Throughput (non-HT) PPDU frames, according to an embodiment.

FIG. 22 shows a Table 5 of RXVECTOR parameters, according to another embodiment.

DETAILED DESCRIPTION

Figure 1:
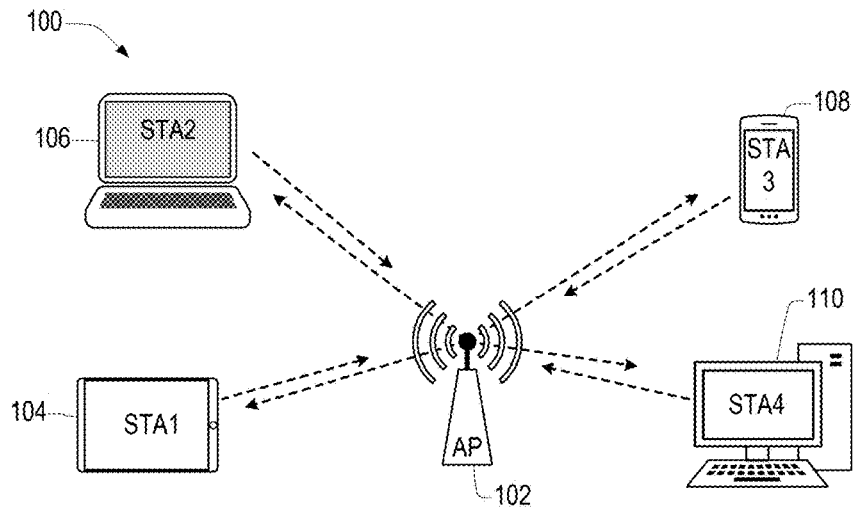
FIG. 1 illustrates a wireless network according to an embodiment.

The technology described herein relates generally to wireless networking. More particularly, the technology relates Multi-User (MU) communications, including MU Multiple-Input-Multiple-Output (MU-MIMO) communications, Orthogonal Frequency Division Multiple Access (OFDMA) communications, and communications that use both MU-MIMO and OFDMA.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN (WLAN), the BSS provides the basic organizational unit and typically includes an Access Point (AP) and one or more associated stations (STAs). In FIG. 1, the BSS 100 includes an Access Point 102 (also referred to as the AP) wirelessly communicating with first, second, third, and fourth wireless devices (or stations) 104, 106, 108, and 110 (also referred to as stations STA1, STA2, STA3, and STA4, respectively). The wireless devices may each include a medium access control layer (MAC) and a physical layer (PHY) according to an IEEE 802.11 standard.

Although FIG. 1 shows the BSS 100 including only the first to fourth stations STA1 to STA4, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, a single Orthogonal Frequency Division Multiple Access (OFDMA) frame, or a single MU-MIMO OFDMA frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame, an UL MU-MIMO frame, or an UL MU-MIMO OFDMA frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations STA1 to STA4 and the AP 102 may be respectively implemented using hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may configured able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and a subtype field included in a control field of the frame, as prescribed in the applicable standard.

Figure 2:
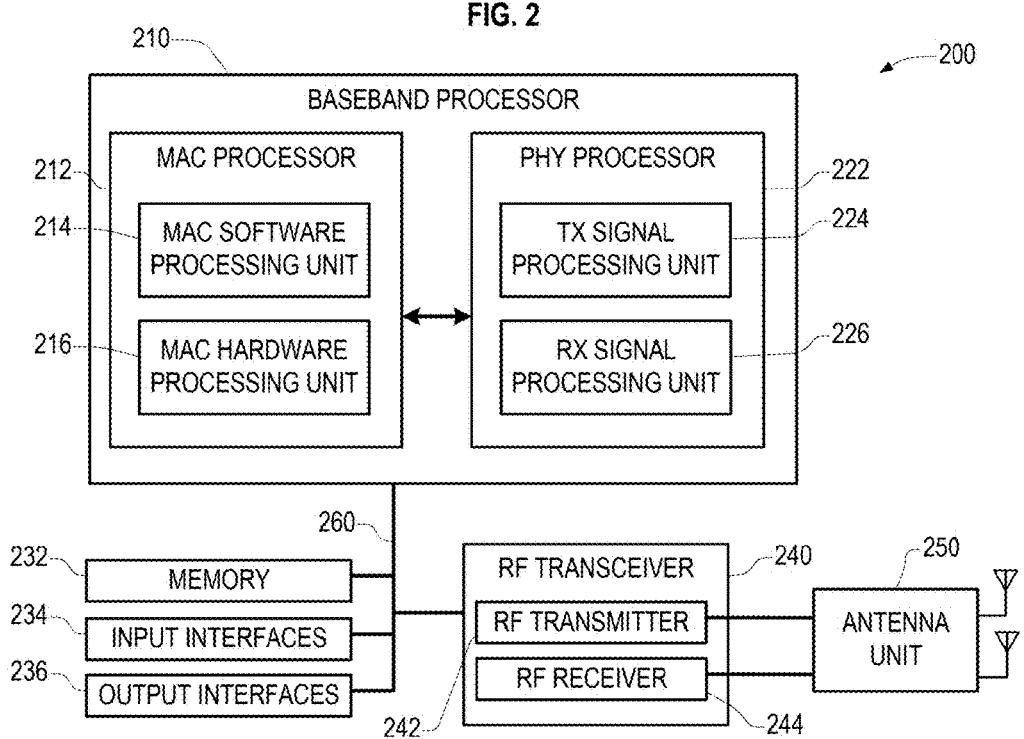
FIG. 2 is a schematic diagram of a wireless device, according to an embodiment.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the memory 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
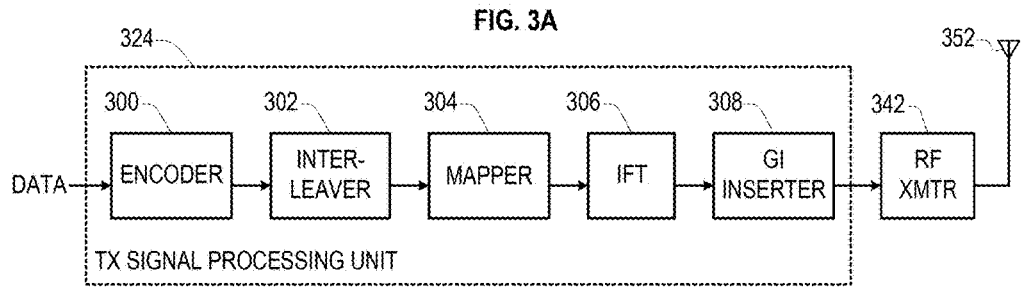
FIG. 3A illustrates components of a wireless device configured to transmit data, according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
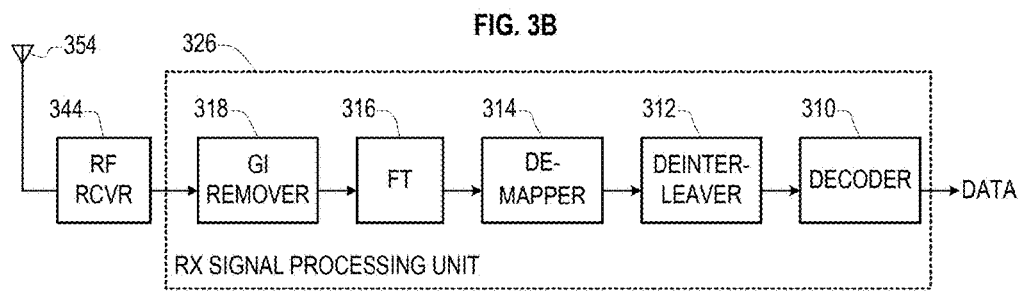
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

Figure 4:
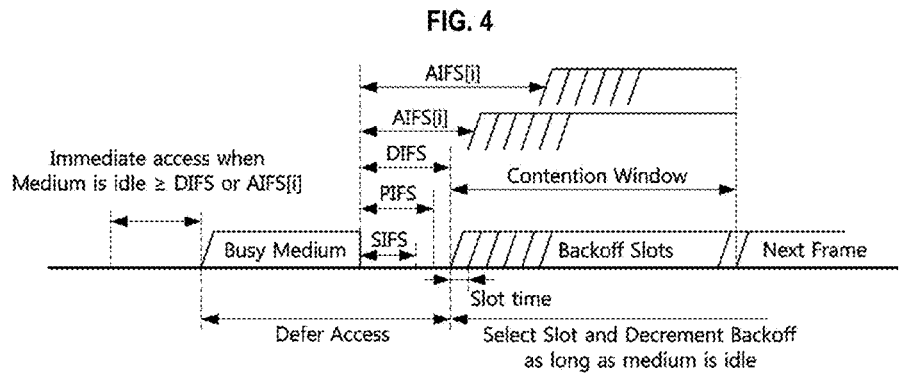
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
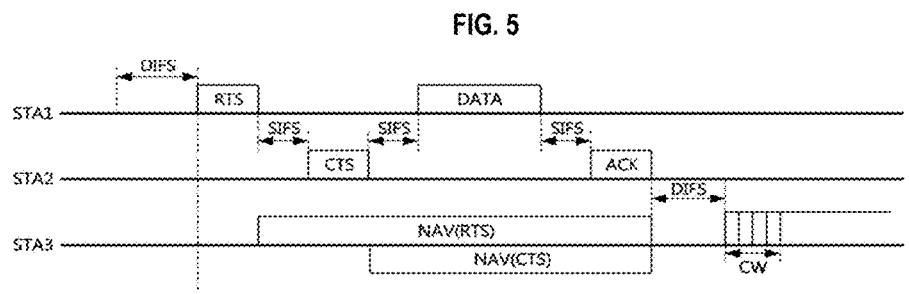
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 5 shows the second station STA1 transmitting an ACK frame to acknowledge the successful reception of a frame by the recipient. FIG. 6 illustrates an embodiment in which a station acknowledges successful receipt of a frame using a Block Acknowledgment (Block Ack, BlockAck, or BA) frame.

The Block Ack mechanism improves channel efficiency by aggregating several acknowledgments into one frame. There are two types of Block Ack mechanisms: Immediate and Delayed. The Immediate Block Ack mechanism is intended for use with high-bandwidth, low-latency traffic. The delayed Block Ack mechanism is intended for applications that tolerate moderate latency.

Here, a station with data to send which will be acknowledged using the Block Ack mechanism is referred to as the originator, and the receiver of that data as the recipient. An AP can be the recipient or the originator.

The Block Ack mechanism is initialized using a setup process that includes an exchange of ADDBA Request and ADDBA Response frames. The ADDBA Request and ADDBA Response frames include indications of whether Aggregate MAC Service Data Units (A-MSDUs) are permitted in the frames using the Black Ack mechanism, whether Immediate or Delayed Block Ack is to be used, and other information.

After initialization, blocks of data frames—in particular, Quality of Service (QoS) data frame according to IEEE Std 802.11-2012—may be transmitted from the originator to the recipient. A block may be started within a polled TXOP or by winning Enhanced Distributed Channel Access (EDCA) contention. The number of frames in the block is limited, and the amount of state that is to be kept by the recipient is bounded.

The MAC Protocol Data Units (MPDUs) within the block of frames are acknowledged by a BlockAck frame, which is requested by a BlockAckReq frame.

The Block Ack mechanism does not require the setting up of a Traffic Stream (TS); however, QoS stations using the TS facility may choose to signal their intention to use a Block Ack mechanism for the scheduler's consideration in assigning Transmission Opportunities (TXOPs).

Acknowledgments of frames belonging to the same Traffic Identifier (TID), but transmitted during multiple TXOPs, may also be combined into a single BlockAck frame. This mechanism allows the originator to have flexibility regarding the transmission of data MPDUs. The originator may split the block of frames across TXOPs, separate the data transfer and the Block Ack exchange, and interleave blocks of MPDUs carrying all or part of MAC Service Data Units (MSDUs) or Aggregate MSDUs (A-MSDUs) for different TIDs or receiver addresses.

The Block Ack mechanism is torn down using a DELBA frame including a DELBA Request. The DELBA frame is sent by either the originator or the recipient to terminate participation in the Block Ack mechanism.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Convergence Protocol (PLCP) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

A PHY entity may define PPDUs that are individually addressed using an Association Identifier (AID) or Partial AID and may also define PPDUs that are group addressed based on Group ID (GID).

A PHY entity may provide support for 20 MHz, 40 MHz, 80 MHz, and 160 MHz contiguous channel widths and support for an 80+80 MHz non-contiguous channel width. Each channel includes a plurality of subcarriers, which may also be referred to as tones. Data subcarriers within the channels may be modulated using binary phase shift keying (BPSK), quadrature phase shift keying (QPSK), 16-quadrature amplitude modulation (16-QAM), 64-QAM, and 256-QAM. Forward error correction (FEC) coding (such as convolutional or Low Density Parity Check (LDPC) coding) may be used with coding rates of 1/2, 2/3, 3/4 and 5/6.

A PHY entity may define fields denoted as Legacy Signal (L-SIG), Signal A (SIG-A), and Signal B (SIG-B) within which some necessary information about PLCP Service Data Unit (PSDU) attributes are communicated. For example, a High Efficiency (HE) PHY entity may define an L-SIG field, an HE-SIG-A field, and an HE-SIG-B field. In an embodiment, the symbols in the L-SIG, SIG-A, and SIG-B fields are encoded with the most robust (and therefore least efficient) MCS of the PHY entity.

To prevent excessive consumption of WLAN resource by overhead, the L-SIG, HE-SIG-A, and HE-SIG-B fields have a limited number of bits and it is advantageous to encode them in the most compact form possible. In a receiving STA, the symbols of these fields are decoded first in order to obtain vital information about the PSDU attributes and some MAC attributes.

In the IEEE Std 802.11ac, SIG-A and SIG-B fields are called VHT SIG-A and VHT SIG-B fields. Hereinafter, IEEE Std 802.11ax SIG-A and SIG-B fields are respectively referred to as HE-SIG-A and HE-SIG-B fields.

FIG. 6A illustrates an HE PPDU 600 according to an embodiment. A transmitting station generates the HE PPDU frame 600 and transmits it to one or more receiving stations. The receiving stations receive, detect, and process the HE PPDU frame 600.

The HE PPDU frame 600 includes a Legacy Short Training Field (L-STF) field 602, a Legacy (i.e., a Non-High Throughput (Non-HT)) Long Training Field (L-LTF) 604, a Legacy Signal (L-SIG) field 606, and a Repeated L-SIG field (RL-SIG) 608, which together comprise a legacy preamble

601. The L-STF 604 of a non-trigger-based PPDU has a periodicity of 0.8 µs with 10 periods.

The HE PPDU frame 600 also includes an HE-SIG-A field 610, an optional HE-SIG-B field 612, an HE-STF 614, an HE-LTF 616, and an HE-Data field 618.

The legacy preamble 601, the HE-SIG-A field 610, and the HE-SIG-B field 612 when present, comprise a first part of the HE PPDU frame 600. In an embodiment, the first part of the HE PPDU frame 600 is decoded using a 64-element Discrete Fourier Transform (DFT), having a basic subcarrier spacing of 312.5 KHz.

The HE-SIG-A field 610 is duplicated on each 20 MHz segment after the legacy preamble to indicate common control information. The HE-SIG-A field 610 includes a plurality of OFDM HE-SIG-A symbols 620 each having a duration (including a Guard Interval (GI)) of 4 µs. A number of the HE-SIG-A symbols 620 in the HE-SIG-A field 610 is indicated by $N_{HESIGA}$ and is either 2 or 4.

The HE-SIG-B field 612 is included in Down-Link (DL) Multi-User (MU) PPDUs. The HE-SIG-B field 612 includes a plurality of OFDM HE-SIG-B symbols 622 each having a duration including a Guard Interval (GI) of 4 µs. In embodiments, Single User (SU) PPDUs, Up-Link (UL) MU PPDUs, or both do not include the HE-SIG-B field 612. A number of the HE-SIG-B symbols 622 in the HE-SIG-B field 612 is indicated by $N_{HESIGB}$ and is variable.

When the HE PPDU 600 has a bandwidth of 40 MHz or more, the HE-SIG-B field 612 may be transmitted in first and second HE-SIG-B channels 1 and 2. The HE-SIG-B field in the HE-SIG-B channel 1 is referred to as the HE-SIG-B1 field, and the HE-SIG-B field in the HE-SIG-B channel 2 is referred to as the HE-SIG-B2 field. The HE-SIG-B1 field and the HE-SIG-B2 field are communicated using different 20 MHz bandwidths of the HE PPDU 600, and may contain different information. Within this document, the term "HE-SIG-B field" may refer to an HE-SIG-B field of a 20 MHz PPDU, or to either or both of an HE-SIG-B1 field or HE-SIG-B2 field of a 40 MHz or more PPDU.

An HE-STF 614 of a non-trigger-based PPDU has a periodicity of 0.8 µs with 5 periods. A non-trigger-based PPDU is a PPDU that is not sent in response to a trigger frame. An HE-STF 614 of a trigger-based PPDU has a periodicity of 1.6 µs with 5 periods. Trigger-based PPDUs include UL PPDUs sent in response to respective trigger frames.

The HE-LTF 616 includes one or more OFDM HE-LTF symbols 626 each having a duration of 12.8 µs plus a Guard Interval (GI). The HE PPDU frame 600 may support a 2×LTF mode and a 4×LTF mode. In the 2×LTF mode, an HE-LTF symbol 626 excluding a Guard Interval (GI) is equivalent to modulating every other tone in an OFDM symbol of 12.8 µs excluding the GI, and then removing the second half of the OFDM symbol in a time domain. A number of the HE-LTF symbols 626 in the HE-LTF field 616 is indicated by $N_{HELTF}$, and is equal to 1, 2, 4, 6, or 8.

The HE-Data field 618 includes one or more OFDM HE-Data symbols 628 each having a duration of 12.8 µs plus a Guard Interval (GI). A number of the HE-Data symbols 628 in the HE-Data field 618 is indicated by $N_{DATA}$ and is variable.

FIG. 6B shows a Table 1 indicating additional properties of the fields of the HE PPDU frame 600 of FIG. 6A, according to an embodiment.

The descriptions below, for sake of completeness and brevity, refer to OFDMA-based 802.11 technology. Unless otherwise indicated, a station refers to a non-AP HE STA, and an AP refers to an HE AP.

Figure 7:
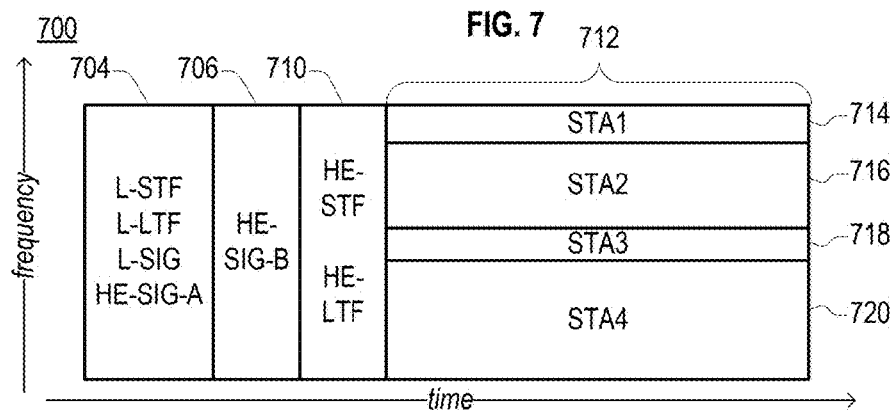
FIG. 7 illustrates a DL MU OFDMA PPDU being transmitted to a set of stations, according to an embodiment.

FIG. 7 illustrates transmission of a DL MU OFDMA PPDU 700 to a set of stations, according to an embodiment. The set of stations includes first, second, third, and fourth stations STA1, STA2, STA3, and STA4. The concepts described herein with respect to DL OFDMA frame 700 also apply to UL OFDMA frames unless specifically stated otherwise. The bandwidth of the DL OFDMA frame 700 may be 20, 40, 80, 160, or 80+80 MHz.

In FIG. 7, a horizontal dimension is a time dimension or number of OFDM symbols, and a vertical dimension is a frequency dimension, or a number of tones or subcarriers. For a given Fourier Transform (FT) size, the number of tones is a fixed value; however, depending on the subcarrier spacing, two OFDM symbols with, for example, respective FT sizes of 64 and 256 may require the same bandwidth to transmit.

Hereinafter, the term sub-band refers to a set of contiguous subcarriers (that is, a set of subcarriers for which no subcarrier not in the set is between any two subcarriers within the set) that as a whole are assigned for a payload whose expected destination is a single station, or a set of stations. A set of sub-bands or a set of subcarriers may also be referred to as a Resource Unit (RU).

In an embodiment, the set of contiguous subcarriers is a set of contiguous data subcarriers (that is, a set of data subcarriers for which no data subcarrier not in the set is between any two data subcarriers within the set).

A sub-band is represented in FIG. 7 as a horizontal partition of the DL OFDMA PPDU 700 where a set of contiguous tones for a contiguous set of OFDM symbols are designated for a given payload whose expected destination is a station or a set of stations. The bandwidth assigned to payloads of the stations STA1 to STA4 depend on the respective payload sizes, on a MCSs and numbers of spatial streams that the AP determines for the respective sub-band transmissions, and on the overall considerations that the AP needs to address in order to align the length or duration of various PSDU sub-bands.

The DL OFDMA PPDU 700 includes a first portion 704 including an L-STF, an L-LTF, and an L-SIG field based on IEEE Std 802.11n and 802.11ac. The symbols in these fields serve to make the DL OFDMA PPDU 700 compatible with legacy designs and products.

The L-STF, L-LTF, and L-SIG symbols of the first portion 704 are modulated using a Fourier Transform (FT) size of 64 on a 20 MHz channel and are duplicated within each 20 MHz channel of the DL OFDMA PPDU 700 when the DL OFDMA PPDU 700 has a bandwidth wider than 20 MHz.

The first portion 704 also includes an HE-SIG-A field. The symbols of the HE-SIG-A field may carry necessary information regarding each PSDU and regarding the RF, PHY, and MAC properties of the DL OFDMA PPDU 700.

The DL OFDMA PPDU 700 includes an HE-SIG-B field 706. The symbols of the HE-SIG-B field 706 may carry necessary information regarding each PSDU and regarding the RF, PHY, and MAC properties of the DL OFDMA PPDU 700. In an embodiment, the HE-SIG-B field 706 may not always be present in all DL OFDM PPDUs and is not present in UL OFDMA PPDUs.

When the DL OFDMA PPDU 700 has a bandwidth of 40 MHz or more, the HE-SIG-B field 612 may be transmitted in first and second HE-SIG-B channels 1 and 2 respectively including an HE-SIG-B1 field and an HE-SIG-B2 field. The HE-SIG-B1 field and the HE-SIG-B2 field are communicated in first and second 20 MHz bandwidths of the DL OFDMA PPDU 700, respectively, and may contain different information. The HE-SIG-B1 and HE-SIG-B2 fields are duplicated within each 40 MHz bandwidth of the DL OFDMA PPDU 700 when the DL OFDMA PPDU 700 has a bandwidth of 80 MHz or more.

In an embodiment, the HE-SIG-A field of the first portion 704 and HE-SIG-B field 706 are modulated using an FT size of 64. In another embodiment, the HE-SIG-A field of the first portion 704 and HE-SIG-B field 706 are modulated using an FT size of 256. In another embodiment, the HE-SIG-A field of the first portion 704 are modulated using an FT size of 64 and the HE-SIG-B field 706 are modulated using an FT size of 256.

The DL OFDMA PPDU 700 includes HE-STF and HE-LTF symbols in a second portion 710. The HE-STF and HE-LTF symbols are used to perform necessary RF and PHY processing for each PSDU in the DL OFDMA PPDU 700, for the whole DL OFDMA PPDU 700, or both. Depending on whether the HE-STF and HE-LTF symbols in the second portion 710 are beamformed or not, there might be two or more sets of such symbols.

The DL OFDMA PPDU 700 includes a Multi-User (MU) payload region 712. The MU payload region 712 includes first, second, third, and fourth unicast PSDUs 714, 716, 718, and 720 intended for the first, second, third, and fourth stations STA1, STA2, STA3, and STA4, respectively. Each unicast PSDU 714, 716, 718, and 720 contains a respective payload that is destined to the respective stations STA1, STA2, STA3, and STA4 plus necessary MAC padding and PHY padding. The unicast PSDU 714, 716, 718, and 720 are sub-band PSDUs.

A bandwidth of the MU payload region 712 is divided into one or more Resource Units (RUs), and each of the PSDUs 714, 716, 718, and 720 are allocated one or more of the RUs. In an embodiment, an RU is allocated to no more than one PSDU.

In an embodiment including MU-MIMO communications, an RU may be allocated to a plurality of PSDUs destined for respective stations, each of the plurality of PSDUs being communicated in a respective set of one or more spatial streams within the bandwidth of the RU.

The unicast PSDUs 714, 716, 718, and 720 are destined to respective stations that are associated with the AP. The presence and length of unicast PSDUs 714, 716, 718, and 720 in respective one or more sub-bands and the respective stations that are the recipients of the unicast PSDUs 714, 716, 718, and 720 may be indicated by the HE-SIG-A field, the HE-SIG-B field, or both.

In an embodiment, the DL OFDMA PPDU 700 may include a full-band transmission region (not shown) for unicast or broadcast/multicast full-band PSDU(s). The full-band transmission region may be an optional region in a DL OFDMA PPDU 700 and may have a variable length. The full-band transmission region includes one or more sequential symbols that each covers the whole bandwidth of the DL OFDMA PPDU 700 and that occur before the start of a MU payload region 712. The full-band transmission region may not be present in an UL OFDMA PPDU.

When the full-band transmission region is present in the DL OFDMA PPDU 700, there may be a set of HE-STF and/or HE-LTF symbols that immediately precede the full-band PSDUs included in the full-band transmission region (not shown), where the set of HE-STF and/or HE-LTF symbols are not beamformed. The one or more full-band PSDUs in the full-band transmission region 708 could be carried with FT size=64 or FT size=256 according to a design choice to have the full-band PSDUs in the full-band transmission region 708 carried with FT size=64 as the HE-SIG-A field is or carried with FT size=256 as the MU payload region 712 is.

One or more of a Broadcast full-band PSDU, a Multicast full-band PSDU, and a unicast full-band PSDUs may be located in the full-band transmission region and destined to all, some, or one, respectively, of the stations that are associated with the AP. The presence and length of the full-band PSDUs may be indicated in the HE-SIG-A field, the HE-SIG-B field, or both.

Each PSDU in the DL OFDMA PPDU 700, whether full-band or sub-band, contains a payload that is destined to a station, or to several stations, plus the necessary MAC padding and PHY padding.

Embodiments include signaling, either explicit or implicit, for indicating between various sounding feedback procedures.

A channel state information (CSI) feedback procedure, also known as sounding procedure, consist of a transmission, by the beamformer (such as an AP), of a non-data packet announcement (NDPA) transmission followed by non-data packet (NDP). In response to the NDPA transmission and the NDP, a beamformee (such as a station) transmits CSI feedback to the beamformer.

In an embodiment, in order to reduce overall sounding overhead, one or more beamformees may send the feedback packets at the same time in an Up-Link (UL) Multi-User (MU) transmission using OFDMA, MU-MIMO, or both. The uplink OFDMA and/or MU-MIMO transmissions, denoted as a UL MU transmission, are sent in response to a trigger frame. The trigger frame facilitates resource assignment among the participants in the UL MU transmission such that the transmissions that make up the UL MU transmission do not overlap in a frequency domain, do not overlap in a spatial domain, or both.

Embodiments include two procedures for providing CSI feedback in a wireless network according to an IEEE 802.11 standard. In a first procedures, a single user provides CSI feedback using a UL Single-User (SU) MIMO transmission. In a second procedures, a plurality of users provide CSI feedback simultaneously using an UL MU transmission that uses OFDMA, MU-MIMO, or both. Beamformees, that is, nodes providing CSI feedback, are configured to recognize which of the first and second procedures is being used. Embodiments include mechanisms for indicating which of the first and second procedures the beamformees should expect and conform to.

Figure 8A:
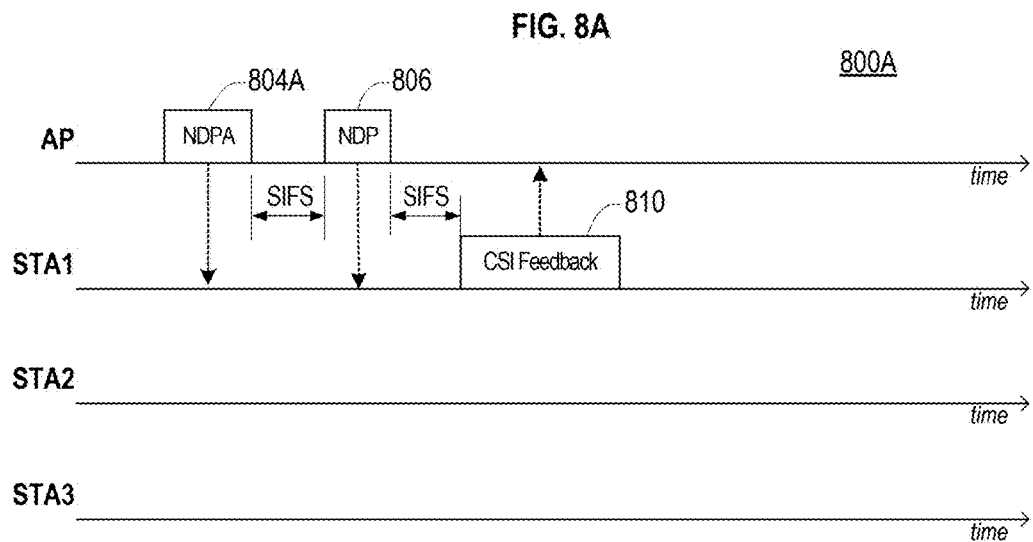
FIG. 8A illustrates a first process for obtaining Channel State Information (CSI) feedback using a first sounding procedure, according to an embodiment.
Figure 8B:
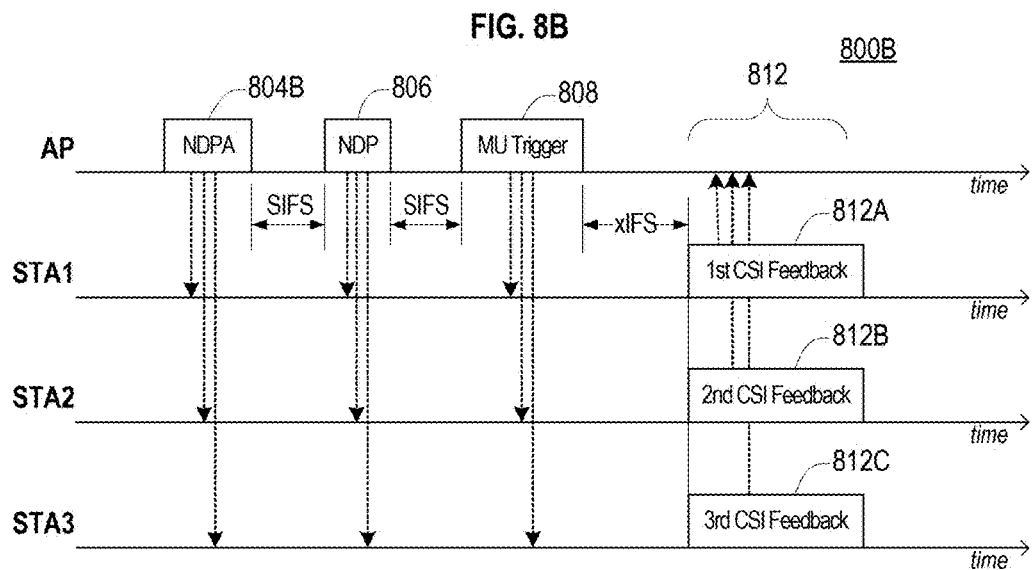
FIG. 8B illustrates a second process for obtaining CSI feedback using the second sounding procedure, according to the embodiment.

In an embodiment, either of a first sounding procedure illustrated in FIG. 8A and a second sounding procedure illustrated in FIG. 8B may be used. Which of the first sounding procedure and the second sounding procedure is used is indicated by a number of per-station information fields in the NDPA frame. The NDPA frame contains parameters for CSI feedback as well as list of STAs that are directed to participate in the CSI feedback process.

FIG. 8A illustrates a first process 800A for obtaining CSI feedback using the first sounding procedure, according to the embodiment. In the first process 800A, an AP transmits an NPDA 804A designating only a single station, a first station STA1. The AP then transmits an NDP 806.

The first station STA1 receives the NPDA 804A, determines that it indicates only a single station (itself), and based on the NPDA 804A indicating only a single station (that is, based on the NDPA 804A not indicating a plurality of stations) determines that the first sounding procedure for obtaining CSI feedback is being used. The first station STA1 then receives the NDP 806 and uses it to compute CSI feedback.

When the first station STA1 determines that the first sounding procedure for CSI feedback is being used, then in response to the NDP 806, the first station STA1 transmits its CSI feedback after a SIFS has elapsed from the end of the NDP 806. The first station STA1 transmits its CSI feedback in a Single User MIMO (SU-MIMO) UL transmission 810.

FIG. 8B illustrates a second process 800B for obtaining CSI feedback using the second sounding procedure, according to the embodiment. In the second process 800B, the AP transmits an NPDA 804B designating first, second, and third stations STA1, STA2, and STA3, respectively. The AP then transmits the NDP 806.

Each of the first, second, and third stations STA1, STA2, and STA3 receives the NPDA 804B, determines that it indicates a plurality of stations including itself, and based on the NPDA 804B indicating a plurality of stations, determines that the second sounding procedure for obtaining CSI feedback is being used.

The first, second, and third stations STA1, STA2, and STA3 then receive the NDP 806 and use it to compute first, second, and third CSI feedback, respectively.

An SIFS after the NDP, the AP transmits an MU Trigger frame 808. The MU Trigger frame 808 indicates to the stations which resources (such as OFDMA Resource Units (RUs), MIMO spatial streams, or both) each of the stations STA1, STA2, and STA3 that providing the CSI feedback should use to provide the CSI feedback.

When the first, second, and third stations STA1, STA2, and STA3 have respectively determined that the second sounding procedure for CSI feedback is being used, in response to the MU Trigger 808, the first, second, and third stations STA1, STA2, and STA3 transmit the first, second, and third CSI feedback, respectively, an Inter-Frame Space (xIFS) after the end of the frame including the MU Trigger 808 as part of an MU UL transmission 812. The Inter-Frame Space may be any one of an SIFS, a PIFS, a DIFS, or an AIFS.

The MU UL transmission 812 includes first, second, and third transmissions 812A, 812B, and 812C transmitted by the first, second, and third stations STA1, STA2, and STA3, respectively, and respectively including the first, second, and third CSI feedback.

In an embodiment, the UL MU transmission 812 is an OFDMA transmission and each of the first, second, and third transmissions 812A, 812B, and 812C is transmitted in a different Resource Unit (RU). In an embodiment, the UL MU transmission 812 is an MU-MIMO transmission and each of the first, second, and third transmissions 812A, 812B, and 812C is transmitted using a different spatial stream.

In an embodiment, MU Trigger frame 808 allocates resources to fewer than all of the stations indicated in the NPDA 804B. When MU Trigger frame 808 allocates resources to fewer than all of the stations indicated in the NPDA 804B, only stations directed to participate in the sounding process 800B by the NPDA 804B and having resources allocated to them by the MU Trigger frame 808 transmit CSI information in response to the MU Trigger frame 808.

In an embodiment, a sounding poll frame is transmitted instead of the MU Trigger frame 808. When the sounding poll frame is transmitted, only the station selected by the sounding poll frame transmits CSI feedback, and the selected station transmits the CSI feedback in a Single-User (SU) transmission.

Figure 9A:
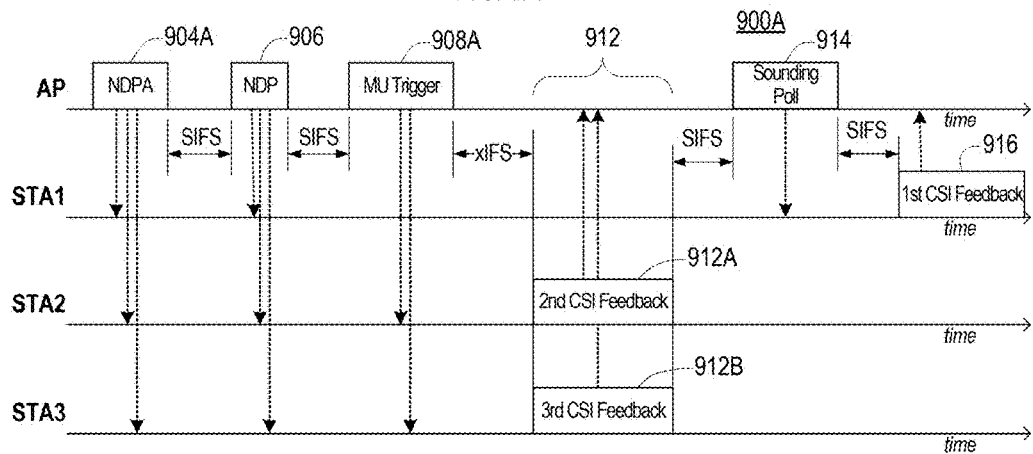
FIG. 9A illustrates a first process for obtaining CSI feedback using a first sounding procedure, according to another embodiment.
Figure 9B:
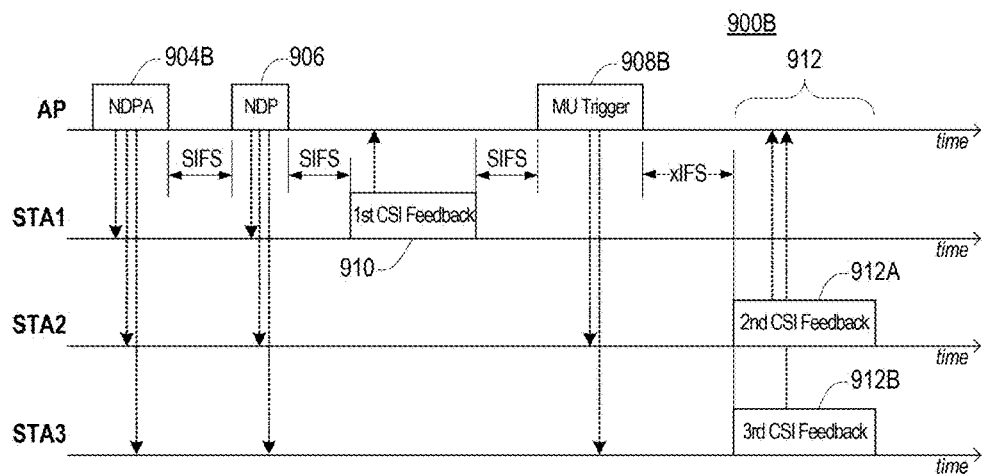
FIG. 9B illustrates a second process for obtaining CSI feedback using a second sounding procedure, according to the other embodiment.

In another embodiment, when more than one station is directed to participate in a sounding process, either of a first sounding procedure illustrated in FIG. 9A and a second sounding procedure illustrated in FIG. 9B may be used. Which of the first sounding procedure and the second sounding procedure is being used is indicated in an NDPA. The NDPA includes parameters for CSI feedback as well as list of stations that are directed to participate in the CSI feedback process.

FIG. 9A illustrates a first process 900A for obtaining CSI feedback using the first sounding procedure, according to the embodiment. In the first process 900A, an AP transmits an NDPA 904A that includes an indication that the AP will transmit an MU trigger frame 908A immediately after an SIFS elapses after the end of an upcoming NDP 906.

An SIFS after then end of the NDPA 904A, the AP transmits the NDP 906. An SIFS after then end of the NDP 906, the AP transmits the MU trigger frame 908A.

First, second, and third stations STA1, STA2, and STA3 respectively receive the NDPA 904A, determine that they are to participate in the polling process, and determine that the MU trigger frame 908A will be transmitted immediately after an SIFS elapses after the end of the NDP 906.

The first, second, and third stations STA1, STA2, and STA3 respectively receive the NDP 906, and use it to compute first, second, and third CSI feedback, respectively. Because the first, second and third stations STA1, STA2, and STA3 have respectively determined that the MU trigger frame 908A will be transmitted immediately after an SIFS elapses after the end of the NDP 906, the first, second, and third stations STA1, STA2, and STA3 do not perform a transmission in response to the NDP 906.

The AP transmits the MU trigger frame 908A immediately after an SIFS elapses after the end of the NDP 906. The first, second, and third stations STA1, STA2, and STA3 respectively receive the MU trigger frame 908A and respectively determine which resources (such as OFDMA Resource Units (RUs), MIMO spatial streams, or both) to use to provide the CSI feedback. In the example shown, the MU Trigger frame 908A only allocates resources for CSI feedback to the second and third stations STA2 and STA3, and as a result only the second and third stations STA2 and STA3 transmit CSI information in response to the MU Trigger frame 908A.

In response to the MU Trigger frame 908A, the second and third stations STA2 and STA3 transmit the second and third CSI feedback, respectively, an Inter-Frame Space (xIFS) after the end of the frame including the MU Trigger frame 908A as part of an MU UL transmission 912.

The MU UL transmission 912 includes first and second transmissions 912A and 912B transmitted by the second and third stations STA2 and STA3, respectively. In an embodiment, the UL MU transmission 912 is an OFDMA transmission and each of the first and second transmissions 912A and 912B is transmitted in a different Resource Unit (RU). In an embodiment, the UL MU transmission 912 is an MU-MIMO transmission and each of the first and second transmissions 912A and 912B is transmitted using a different spatial stream.

An SIFS after the end of the MU UL transmission 912, the AP transmits a sounding poll 914 to the first station STA1. In response to the sounding poll 914, the first station STA1 transmits the first CSI feedback to the AP an SIFS after the end of the sounding poll 914. In an embodiment, the first CSI feedback is sent in an UL SU-MIMO transmission.

In another embodiment, an NDPA and NDP may be sent to the first station STA1 instead of the sounding poll 914.

FIG. 9B illustrates a second process 900B for obtaining CSI feedback using the second sounding procedure, according to the embodiment. In the second process 900B, an AP transmits an NDPA 904B that includes a list of per-station information field and an indication that the AP will not transmit an MU trigger frame immediately after an SIFS elapses after the end of an upcoming NDP 906.

In an embodiment, the NDPA 904B indicates that that the AP will not transmit the MU trigger frame immediately after the SIFS elapses after the end of the NDP 906 by not including the indication that the AP will transmit the MU trigger frame 908A immediately after the SIFS elapses after the end of the NDP 906 that was included in the NDPA 904A of FIG. 9A.

An SIFS after the end of the NDPA 904B, the AP transmits the NDP 906. The first, second, and third stations STA1, STA2, and STA3 receive the NDP 906 and use it to compute first, second, and third CSI feedback, respectively.

When the NDPA 904B contains the indication that the AP will not transmit the MU trigger frame immediately after the SIFS elapses after the end of the NDP 906, the first station STA1 in the per-station information field list of the NDPA 904B, in response to the NDP 906, transmits CSI feedback immediately after a SIFS elapses after the NDP 906.

The rest of the stations (stations STA2 and STA3) in the per-STA information list, because they are not the first station in that list, wait for either an MU trigger frame 908B or a sounding poll frame. In response to the MU trigger frame 908B the second and third stations STA2 and STA3 transmit the second and third CSI feedback, respectively, an Inter-Frame Space (xIFS) after the end of the frame including the MU Trigger frame 908A. The second and third CSI feedback are transmitted as part of an MU UL transmission 912.

The MU UL transmission 912 includes first and second transmissions 912A and 912B transmitted by the second and third stations STA2 and STA3 and including the second and third CSI feedback, respectively. In an embodiment, the UL MU transmission 912 is an OFDMA transmission. In an embodiment, the UL MU transmission 912 is an MU-MIMO transmission.

Because the sounding procedure and how the first station STA1 in the per-station information field list responds to an NDP 906 changes depending on which sounding procedure is chosen by the AP, the NDPA 904B contains the indication on which procedure was chosen (or equivalently, whether the first station STA1 is to immediately transmit the CSI after the NDP 906 or wait for either an MU trigger or sounding poll frame).

Figure 10:
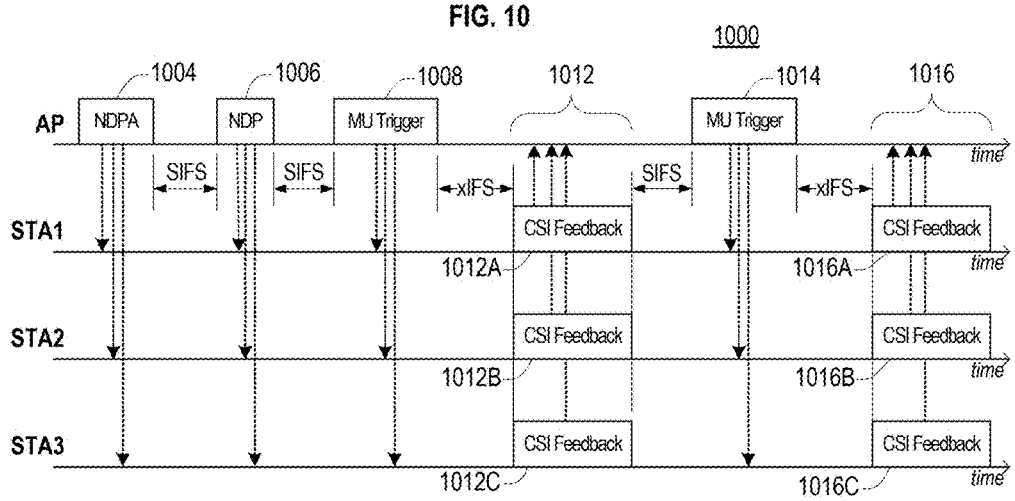
FIG. 10 illustrates a process for obtaining CSI feedback, according to an embodiment.

In the embodiments of FIGS. 8A and 8B or the embodiments of FIGS. 9A and 9B, an AP may transmit a second MU trigger frame after the UL MU transmissions of CSI feedback, as shown in FIG. 10. Transmitting a second MU trigger frame may be required when one or more stations were not able to send all the CSI feedback in a single uplink MU transmission.

In the process 1000 of FIG. 10, an AP transmits a NDPA 1004 to first, second, and third stations STA1, STA2, and STA3. The NDPA 1004 includes an indication that a first MU Trigger frame 1008 will be transmitted after a next NDP 1006.

The stations STA1, STA2, and STA3 respectively receive the NDPA 1004, and determine, by decoding the NDPA 1004, that they are to participate in the process 1000 and that the first MU Trigger frame 1008 will be transmitted after the NDP 1006.

The AP transmits the NDP 1006 a SIFS after the end of the NDPA 1004. The stations STA1, STA2, and STA3 receive the NDP 1006 and determine respective CSI information using the NDP 1006.

The AP transmits the first MU Trigger frame 1008 a SIFS after the end of the NDP 1006.

In response to the first MU Trigger frame 1008, the stations STA1, STA2, and STA3 transmit respective first CSI feedback portions 1012A, 1012B, and 1012C as part of a first UL MU transmission 1012.

In an embodiment, the first MU Trigger frame 1008 allocates resources to fewer than all of the stations indicated in the NDPA 1004. When first MU Trigger frame 1008 allocates resources to fewer than all of the stations indicated in the NDPA 1004, only stations directed to participate in the sounding process 1000 by the NDPA 1004 and having resources allocated to them by the first MU Trigger frame 1008 transmit CSI information in response to the first MU Trigger frame 1008.

The AP transmits the second MU Trigger frame 1014 a SIFS after the end of the first UL MU transmission 1012.

In response to the second MU Trigger frame 1014, the stations STA1, STA2, and STA3 transmit respective second CSI feedback portions 1016A, 1016B, and 1016C as part of a second UL MU transmission 1016.

In an embodiment, the second MU Trigger frame 1014 allocates resources to fewer than all of the stations indicated in the NDPA 1004. When the second MU Trigger frame 1014 allocates resources to fewer than all of the stations indicated in the NDPA 1004, only stations directed to participate in the sounding process 1000 by the NDPA 1004 and having resources allocated to them by the second MU Trigger frame 1014 transmit CSI information in response to the second MU Trigger frame 1014.

Embodiments include processes that make efficient use of the medium by not always having a trigger frame or a poll frame following the NDP frame.

Embodiments include processes according to an IEEE 802.11 standard that includes multiple users' simultaneous transmission or reception scheduled within a BSS, wherein an RTS/CTS frame exchange protects multi-station communications efficiently, especially when multiple MU transmissions are performed in a cascaded manner.

When one or more RTS frames are transmitted simultaneously in a DL MU manner, and the one or more RTS frames solicit RF-combined CTS frames from multiple stations, all PPDUs comprising RTS frames shall use the same scrambling initialization (or seed), and all the RTS frames shall solicit CTS frames that use a same MCS. The one or more RTS frames can include a Multi-User RTS (MU-RTS) frame.

Figure 11:
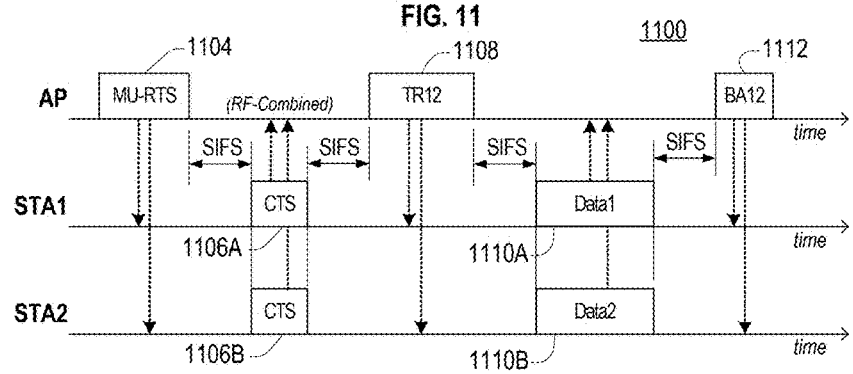
FIG. 11 illustrates a UL MU communication process including an MU-RTS frame, according to an embodiment.

FIG. 11 illustrates a UL MU communication process 1100 including an MU-RTS frame 1104, according to an embodiment. An AP sends an MU-RTS frame 1104 that solicits CTS frame transmissions from first and second stations STA1 and STA2, respectively. In response, the first and second stations STA1 and STA2 respectively transmit first and second CTS frames 1106A and 106B.

The first and second CTS frames 1106A and 1106B are RF-combined in the channel medium. In order to be successfully RF-combined, the first and second CTS frames 1106A and 1106B include, within each 20 MHz bandwidth that is used by both, identical data scrambled using a same scrambling initialization (or seed) value and encoded using an identical MCS.

In an embodiment, when a CTS frame has a bandwidth of 40 MHZ or more, the identical data is replicated in each 20 MHz bandwidth used by the CTS frame. In an embodiment, a number of 20 MHz bandwidths used by the first CTS frame 1106A is different from a number of 20 MHz bandwidths used by the second CTS frames 1106B.

For example, in an illustrative embodiment, the first station STA1 transmits the first CTS frame 1106A using first and second 20 MHz bandwidths, and the second station STA2 transmits the second CTS frame 1106B using only the first 20 MHz bandwidths. The first station STA1 transmits the first CTS frame 1106A by transmitting a same data scrambled using a same scrambling initialization (or seed) value and encoded using an identical MCS in each the first and second 20 MHz bandwidths, and the second station STA2 transmits the second CTS frame 1106B by transmitting the same data scrambled using the same scrambling initialization (or seed) value and encoded using the identical MCS in the first 20 MHz bandwidth. The transmission of the first CTS frame 1106A performed in the first 20 MHz bandwidth and the transmission of the second CTS frame 1106B are RF-combined and received by the AP in the first 20 MHz bandwidth, and the transmission of the first CTS frame 1106A performed in the second 20 MHz bandwidth is received by the AP without being RF-combined.

In response to receiving the RF-combined CTS frames 1106A and 1106B, the AP sends a Trigger frame 1108 that schedules UL MU transmissions from the first and second stations STA1 and STA2.

In response to receiving the Trigger frame 1108, the first and second stations STA1 and STA2 transmit first and second UL data frames 1110A and 1110B, respectively, according to the scheduling information in the Trigger frame 1108. The first and second UL data frames 1110A and 1110B may be in different OFDMA RUs, in different MU-MIMO spatial streams, or both.

In response to receiving the first and second UL data frames 1110A and 1110B, the AP sends an acknowledgement frame 1112 to the first and second stations STA1 and STA2.

In an embodiment, the use of the same scrambling initialization may be guaranteed by not allowing a station to send more than one MU-RTS frame in a PPDU. For example, the MU-RTS frame can be sent using any one of a Non-HT or non-HT-duplicate format, an HT format, a VHT format, an HE SU PPDU format, and an HE MU PPDU format.

In an embodiment wherein the MU-RTS frame is sent using the HE MU PPDU format, the PPDU consists of no more than one MU-RTS frame. In an embodiment wherein the MU-RTS frame is sent using the HE MU PPDU format, transmitting more than one MU-RTS frame in the PPDU is not allowed.

When an MU-RTS frame is sent using a PPDU format that allows an Aggregate MPDU (A-MPDU), the A-MPDU that includes the MU-RTS frame has only one A-MPDU subframe (excluding any null subframes).

In an embodiment, a wireless device transmits a CTS frame using a scrambler initialization (or seed value) determined from a received MU-RTS frame. In an embodiment, mechanisms enable a PHY layer to apply a same scrambler initialization (or seed value) to a CTS frame as a scrambler initialization (or seed value) of a successfully received MU-RTS frame.

FIG. 12A illustrates a process 1200A, performed by a PHY layer of a station, for determining and saving a scrambler initialization (or seed value) from a received PPDU, according to an embodiment.

At S1204, the PHY layer receives a PPDU. In an embodiment, the PPDU includes an MU-RTS frame that targets the station.

At S1206, the PHY layer determines a scrambler initialization (or seed value) from the received PPDU. Processes for determining the scrambler initialization (or seed value) from the received PPDU are described later in this disclosure.

At S1208, the PHY forwards the determined scrambler initialization (or seed value) to a MAC layer of the station. In an embodiment, the MAC layer stores the determined scrambler initialization (or seed value) for later use.

FIG. 12B illustrates a process 1200B, performed by a PHY later of a station, for using a scrambler initialization (or seed value) received from a MAC layer to scramble a PPDU to be transmitted, according to an embodiment.

In an embodiment, the scrambler initialization (or seed value) received from the MAC layer is a scrambler initialization (or seed value) previously forwarded to the MAC layer by the PHY layer using the process 1200A of FIG. 12A.

In an embodiment, the PPDU from which the scrambler initialization (or seed value) was determined by the process 1200A of FIG. 12A includes an MU-RTS frame, and the PPDU to be transmitted is a CTS frame transmitted in response to the MU-RTS frame.

At S1210, the PHY layer receives from the MAC layer an MPDU and an indication of whether generation of a PPDU from the MPDU is to use a scrambler initialization (or seed value) provided by the MAC layer.

At S1212, the PHY layer determines, using the indication, whether to generate the PPDU using the scrambler initialization (or seed value) provided by the MAC layer. When the PPDU is to be generated using the scrambler initialization (or seed value) provided by the MAC layer, the process 1200B proceeds to S1214. Otherwise, at S1212 the process 1200B proceeds to S1216.

In an embodiment, the PPDU is to be generated using the scrambler initialization (or seed value) provided by the MAC layer when the indication has a first state, and using a scrambler initialization (or seed value) generated by the PHY layer when the indication has a state other than the first state (e.g., a second state).

In an embodiment, the MAC layer sets the indication to the first state when the PPDU is a CTS frame to be transmitted in response to an MU-RTS frame received by the process 1200A.

In an embodiment, the MAC layer sets the indication to a state that is not the first state when a PPDU received in the process 1200A is a data frame or management frame.

In an embodiment, the first state of the indication is to include a parameter related to the scrambler initialization/seed in a TXVECTOR set. In an embodiment, the state that is not the first state does not include the parameter.

In an embodiment, the MAC layer sets the indication to the first state only when the PPDU to be transmitted is using a non-HT format or a non-HT duplicate frame format.

At S1214, the PHY layer receives the scrambler initialization (or seed value) provided by the MAC layer. The process 1200B then proceeds to S1218.

At S1216, the PHY layer generates the scrambler initialization (or seed value). In an embodiment, the scrambler initialization (or seed value) is a non-zero pseudo-random value generated by the PHY layer. The process 1200B then proceeds to S1218.

At S1218, the PHY layer generates the PPDU to be transmitted by scrambling data in the MPDU using the scrambler initialization (or seed value) either provided by the MAC layer in S1214 or generated by the PHY layer in S1216.

At S1220, the station transmits the generated PPDU.

FIG. 13 shows a Table 2 illustrating information in a TXVECTOR and an RXVECTOR used for the delivery of information on a scrambler initialization or seed value and whether a MAC-supplied scrambler initialization or seed value should be used.

In an embodiment, a MAC layer includes the TXVECTOR parameter SCRAMBER_INITIALIZATION when signaling the transmission of a CTS frame in response to a MU-RTS frame. In an embodiment, the included TXVECTOR parameter SCRAMBER_INITIALIZATION has a non-zero value.

Data information in a frame is scrambled prior to transmission and de-scrambled at reception. In order to avoid a fixed scrambling pattern, an initial state value of the scrambling sequence (based on maximum length sequence) is chosen. The initial state value determines the scrambling sequence.

The initial state value may at times be chosen using a random or pseudo-random number generator. For example, the initial state value may be a 7-bit non-zero pseudo-random number.

Frames in accordance with an IEEE 802.11 standard can be scrambled using one of first and second scrambling operations.

FIG. 14 illustrates a circuit 1400 for performing the first scrambling operation, according to an embodiment. In the IEEE 802.11 standard, the first scrambling operation is used for frames that do not contain dynamic bandwidth signaling.

The circuit 1400 includes first to seventh state bit latches 1402 to 1414. When the circuit 1400 is in an initialization mode, the first to seventh state bit latches 1402 to 1414 are configured to receive seventh to first initial state bits [7:1], respectively, with the seventh state bit latches 1414 receiving the first initial state bit[1], with the sixth state bit latches 1412 receiving the second initial state bit[2], and so forth. When the circuit 1400 is in a scrambling mode, the second to seventh state bit latches 1404 to 1414 are configured to receive outputs of the first to sixth state bit latches 1402 to 1412, respectively, and the first state bit latch 1402 is configured to receive a scrambling sequence (or scrambling code) SC1 output by a first XOR circuit 1416.

The first XOR circuit 1416 receives the outputs of the fourth and seventh state bit latches 1408 and 1414 and generates an output equal to the exclusive-or of the outputs of the fourth and seventh state bit latches 1408 and 1414. The output of the first XOR circuit 1416 is the scrambling sequence SC1.

A second XOR circuit 1418 receives the output of the first XOR circuit 1416 and a bit of a sequence of Data In bits, and generates an output equal to the exclusive-or of the output of the first XOR circuit 1416 and the bit of the sequence of Data In bits. When the circuit 1400 is used for transmission of a frame, the output of the second XOR circuit 1418 is a scrambled output. When the circuit 1400 is used for reception of the frame, the output of the second XOR circuit 1418 is a descrambled output.

Before scrambling (or descrambling) begins, the circuit 1400 is in the initialization mode, and the seventh to first initial state bits [7:1] of a selected initial state are loaded into the first to seventh state bit latches 1402 to 1414, respectively.

When scrambling (or descrambling) is being performed, the circuit 1400 is in the scrambling mode, in which bits of the scrambling sequence SC1 produced by the first XOR circuit 1416 are bitwise exclusive-or'd with respective bits of the Data In sequence. Bits of the Data In sequence are provided one per clock cycle to the circuit 1400. By clocking the first to seventh state bit latches 1402 to 1414 once for each bit of the Data In sequence, one new bit of the scrambling sequence SC1 is generated for and exclusive-or'd with each bit of the Data In sequence.

During each cycle of the clock, the second to seventh state bit latches 1404 to 1414 are set to respective values that the first to sixth state bit latches 1402 to 1412 had in the previous clock cycle, and the first state bit latch 1402 is set to a value the scrambling sequence SC1 had in the previous clock cycle.

FIG. 15 illustrates a circuit 1500 for performing the second scrambling operation, according to an embodiment. In the IEEE 802.11 standard, the second scrambling operation is used for frames that contain dynamic bandwidth signaling.

The circuit 1500 includes first to seventh state bit latches 1502 to 1514. The second to seventh state bit latches 1504 to 1514 are configured to receive outputs of the first to sixth state bit latches 1502 to 1512, respectively. The first state bit latch 1502 is configured to receive a bit of a scrambling sequence SC2.

A first XOR circuit 1516 receives the outputs of the fourth and seventh state bit latches 1508 and 1514 and generates an output equal to the exclusive-or of the outputs of the fourth and seventh state bit latches 1508 and 1514. The output of the first XOR circuit 1516 is used to provide bits of the scrambling sequence SC2.

A second XOR circuit 1518 receives a bit of the scrambling sequence SC2 and a bit of a sequence of Data In bits, and generates an output equal to the exclusive-or of the bit of the scrambling sequence SC2 and the bit of the sequence of Data In bits. When the circuit 1500 is used for transmission of a frame, the output of the second XOR circuit 1518 is a scrambled output. When the circuit 1500 is used for reception of the frame, the output of the second XOR circuit 1518 is a descrambled output.

Bits of the Data In sequence are provided one per clock cycle to the circuit 1500. During the first seven clock cycles, when the first to seventh bits of the Data In sequence are being provided, a switch 1520 provides first to seventh initial state bits as the first to seventh bits of the scrambling sequence SC2, respectively.

Over the course of the first seven clock cycles, the first to seventh initial state bits are exclusive-or'd with first to seventh bits of the Data In sequence to produce first to seventh bits of the scrambled or descrambled output, respectively. At the same time, the first to seventh initial state bits are shifted into the seventh to first state bit latches 1514 to 1502, respectively.

After the seventh clock cycle, the switch 1520 provides the output of the first XOR circuit 1516 as the scrambling sequence SC2, and the circuit 1500 operates in the same manner as the circuit 1400 of FIG. 14 does when the circuit 1400 is in the scrambling mode.

For both the first scrambling procedure of FIG. 14 and the second scrambling procedure of FIG. 15, after the seventh bit, each new bit of the scrambling sequence is determined by the previous seven bits of the scrambling sequence.

When the initial state is a non-zero positive integer, each of the first and second scrambling operations produce scrambling sequences that repeat after $2^N-1$ bits, where N is the number of the initial state bits. As a result, the respective scrambling sequences produced by the first and second scrambling operations each repeat every 127 bits (i.e., each has a 127-bit long cycle.)

Although FIGS. 14 and 15 are disclosed in terms of hardware implementations for performing the first and second scrambling operations, respectively, embodiments are not limited thereto. For example, in an embodiment, the scrambling sequence is generated using software to shift, mask, and exclusive-or bits in a first register and to exclusive-or the first register with bits from the Data In sequence that are stored in a second register. In another illustrative embodiment, 127-bit scrambling sequence cycles for each valid 7-bit initial state for the first scrambling operation, the second scrambling operation, or both, may be stored and read out of a computer-readable non-transient memory.

FIG. 16 illustrates differences and relationships between scrambling sequences generated by the first and second scrambling operations when using a same initial state. In the example of FIG. 16, initial state bits [0:6] used are 1, 0, 1, 1, 1, 0, and 1, respectively.

FIG. 16 illustrates the first 127 bits of first and second scrambling sequences SC1 and SC2. The first and second scrambling sequences SC1 are cyclic with a period of 127 bits. That is, for all n≥127, an $n^{th}$ bit of the scrambling sequences SC1 is equal to an $(n-127)^{th}$ bit of the scrambling sequences SC1, and an $n^{th}$ bit of the scrambling sequences SC2 is equal to an $(n-127)^{th}$ bit of the scrambling sequences SC2. This can be expressed as:

$$SC[n]=SC[(n+k*127)] \qquad \text{Equation 1}$$

where k is a integer greater than or equal to zero, SC is either of first scrambling sequence SC1 or second scrambling sequence SC2, and SC[x] is an $x^{th}$ bit of SC, wherein bits of the scrambling sequences are numbered starting with 0.

SC1[0:63] lists the first to sixty-fourth bits of a first scrambling sequence generated by the first scrambling operation using the initial state bits [0:6]. SC1[64:126] lists the sixty-fifth to one-hundred-twenty-seventh bits of the first scrambling sequence.

SC2[0:63] lists the first to sixty-fourth bits of a second scrambling sequence generated by the second scrambling operation using the initial state bits[0:6]. SC2[64:126] lists the sixty-fifth to one-hundred-twenty-seventh bits of the second scrambling sequence.

The underlined bits of SC1[0:63] and SC2[0:63] indicate the first (i.e. the foremost) seven bits of the first and second scrambling sequences, respectively. As can be seen in SC2[0:63], the foremost seven bits of the second scrambling sequence are respectively equal to the first to seventh initial state bits (i.e. initial state bits[0:6]).

Also, the last seven bits of the 127-bit cycle of the first scrambling sequence SC1, indicated by E, are equal to the initial state. Because the initial state bits of the circuit 1400 used to generate the first scrambling sequence SC1 are equal to the most recent seven bits of the first scrambling sequence SC1, the first scrambling sequence SC1 repeats the 127-bit cycle.

Also for this reason, if the foremost seven bits of the first scrambling sequence SC1 are used as the initial state of the circuit 1400, a resulting scrambling sequence will be equal to the first scrambling sequence SC1 cyclically rotated to the left by seven bits, so that the foremost seven bits of the first scrambling sequence SC1 become the last seven bits of the 127-bit cycle of the resulting scrambling sequence.

Note that the second scrambling sequence SC2 generated by the second scrambling operation using the initial state of 1011101 can also be generated by the first scrambling operation using the initial state of 0011000, that is, by using the last 7 bits of the 127-bit cycle of the second scrambling sequence SC2 as the initial state for the first scrambling operation.

Also, note that SC1[0:6], indicated by A in FIG. 16, is equal to SC2[7:13], indicated by A'. Similarly, SC1[7:56] (B) is equal to SC2[14:63] (B'), SC1[57:63] (C) is equal to SC2[64:70] (C'), SC1[64:119] (D) is equal to SC2[71:126] (D'), and SC1[120:126] (E) is equal to SC2[0:6] (E'). These relationships hold true for any non-zero seven-bit value of the Initial State, and can be expressed as:

$$SC1[n]=SC2[(n+7) \bmod 127] \qquad \text{Equation 2}$$

where n is any integer equal to or greater than zero. As a result, for any given valid initial state, the 127-bit sequence for SC1 produced using the first scrambling procedure is equal to the 127-bit sequence for SC2 produced using the second scrambling procedure rotated 7 bits to the left. Conversely, for any given valid initial state, the 127-bit sequence for SC2 produced using the second scrambling procedure is equal to the 127-bit sequence for SC1 produced using the first scrambling procedure rotated 7 bits to the right.

In embodiments according to the IEEE 802.11 standard, a receiver node (e.g., a receiving station) receiving a scrambled data sequence can perform de-scrambling without knowing which of the first or second scrambling operation was used to scramble the data at the transmitter. The receiver node can also perform de-scrambling without knowing the initial state used by the transmitter to scramble the data. This is possible because the first 7 bits of the scrambling sequence are always bitwise exclusive-or'd with 0000000 (7 zeros) which are appended in the front of any data being scrambled. These seven zeros are denoted as the Scrambler Initialization subfield (bits B0 to B6) of the PHY SERVICE field in the IEEE 802.11ac standard.

As a result, the foremost seven bits of the scrambled data are always equal to the first 7 bits of the scrambling sequence. Given the first 7 bits of the scrambling sequence, it is possible for the receiver to correctly reconstruct the remainder of the scrambling sequence.

Note that the receiver is not able to correctly determine the initial state value of the scrambling sequence used by the transmitter when the receiver is not aware of which of the first or second scrambling operations was used at the transmitter.

For example, depending on whether the first or second scrambling operation was utilized at the transmitter, the receiver may not know whether the initial value used to generate the scrambling sequence SC2 of FIG. 16 was 1011101 or 0011000.

FIG. 17 illustrates an MU RTS/CTS exchange process 1700, according to an embodiment. In the process 1700, a transmitter node (e.g. an AP) transmits a frame Multi-User Request To Send (MU-RTS) frame 1704. The MU-RTS frame 1704 solicits Clear To Send (CTS) frames from each of the intended receivers (here, first, second, and third stations STA1, STA2, and STA3) of the MU-RTS frame 1704.

Because the first, second, and third stations STA1, STA2, and STA3 will transmit the respective first, second, and third CTS frames 1706A, 1706B, and 1706C simultaneously in response to the MU-RTS frame 1704, the respective contents of those portions of the CTS frames 1706A, 1706B, and 1706C (including the scrambled data) that occupy a same bandwidth need to be identical to each other.

In an embodiment, the CTS frames 1706A, 1706B, and 1706C occupy one or more 20 MHz bandwidths, wherein the respective one or more of 20 MHz bandwidths occupied may differ. Each of the CTS frames 1706A, 1706B, and 1706C replicate a same content in each occupied 20 MHz bandwidth. As a result, when a particular 20 MHz bandwidth is occupied by two or more of the CTS frames 1706A, 1706B, and 1706C, the transmissions of the CTS frames 1706A, 1706B, and 1706C in that particular 20 MHz bandwidth are RF-combined properly.

All of the stations STA1, STA2, and STA3 sending a CTS frame in response to the MU-RTS frame must send a same data and must scramble that data using a same scrambling sequence, so that the CTS frames 1706A, 1706B, and 1706C can be radio frequency (RF) combined in the channel medium. Furthermore, for the CTS frames 1706A, 1706B, and 1706C to be successfully RF-combined, all the stations STA1, STA2, and STA3 transmitting in whole or in part in a particular bandwidth must send their respective CTS frames 1706A, 1706B, and 1706C portions that are transmitted in that particular bandwidth using a same frame formatting, which frame formatting includes modulation, coding rate, encoding scheme, scrambling, and other attributes that effect a waveform of a transmission signal.

For example, in an embodiment, each of the stations STA1, STA2, and STA3 transmit in one or more respective 20 MHz bandwidths, wherein the respective one or more of 20 MHz bandwidths may differ. When two or more of the stations STA1, STA2, and STA3 simultaneously transmit all or part of respective CTS frames 1706A, 1706B, and 1706C in a particular 20 MHz bandwidth, the two or more of the stations STA1, STA2, and STA3 transmitting in the particular 20 MHz bandwidth use a same frame formatting. In an embodiment, each of the stations STA1, STA2, and STA3 uses a same frame formatting in each respectively 20 MHz bandwidth that their respective transmission occupy.

A scrambling sequence for scrambling data in a transmitted frame has been traditionally determined by the transmitting node in a pseudo-random manner. This is done by (pseudo-)randomly choosing an initial state value of the scrambling sequence. However, in order for the CTS frames 1706A, 1706B, and 1706C to be RF combined, identical initial state of a scrambler as well as a same scrambling operation mode (either the first or second scrambling operation of FIGS. 14 and 15, respectively) must be used by all the stations STA1, STA2, and STA3 (that is, all the responding stations) transmitting the CTS frames 1706A, 1706B, and 1706C in response to the MU-RTS frame 1704.

One proposal is for the responding stations to respectively derive, from the MU-RTS frame, an initial state of a scrambler used to scramble data in the MU-RTS frame, and use the derived initial state to configure the initial state of the scrambling operation used to transmit the respective CTS frames. However, to do so, the responding nodes must identify the scrambling operation mode and the initial state value used to transmit the MU-RTS frame, which may be difficult, as explained above.

In an embodiment, each of the responding stations is mandated to use the foremost seven bits of the scrambled bit stream of a received MU-RTS frame, before it is descrambled, as the initial state for the scrambling operation used to transmit their CTS frame in response to the received MU-RTS frame. In an embodiment, the foremost seven bits of the scrambled bit stream, prior to descrambling, corresponds to a Scrambler Initialization value in a Service Field of an RXVECTOR of the received MU-RTS frame. This resolves the initial state estimation ambiguity of the proposal above by eliminating the need to determine the initial state used to scramble the data of the MU-RTS frame.

FIG. 18A illustrates a process 1800 for scrambling data of a CTS frame, according to an embodiment. The CTS frame is a CTS frame to be transmitted in response to an MU-RTS frame.

In the example shown in FIG. 18A, an AP generates a first scrambling sequence 1806 according to the first scrambling procedure 1400 of FIG. 14. In the example, an initial state 1804 having a value of 1011101 is used, which generates the first scrambling sequence 1806 (the RTS Scrambling Sequence, or R-SC) having a foremost (that is, a first in the sequence) seven bits equal to 0110100. However, any valid (e.g. non-zero 7-bit) initial state may be used.

The first scrambling sequence 1806 is exclusive-or'd with MU-RTS Data 1802 to produce the MU-RTS scrambled data 1808. Because a foremost seven bits of the MU-RTS Data 1802 has a value of 0000000, a foremost seven bits of the MU-RTS scrambled data 1808 is equal to the foremost seven bits of the first scrambling sequence 1806.

At S1810, the MU-RTS frame including the MU-RTS scrambled data 1808 is transmitted by the AP to a station.

The station extracts the foremost seven bits of the MU-RTS scrambled data 1808 from the received MU-RTS frame and uses it as the initial state 1814 for generating the second scrambling sequence 1816. Because the foremost seven bits of the MU-RTS scrambled data 1808 are equal to the foremost seven bits of the first scrambling sequence 1806, the initial state 1814 used to generate the second scrambling sequence 1816 is equal to the foremost seven bits of the first scrambling sequence 1806.

The station generates a second scrambling sequence 1816 (the CTS Scrambling Sequence, or C-SC) using the first scrambling procedure 1400 of FIG. 14 and the initial state 1814 having the value equal to the foremost seven bits of the first scrambling sequence 1806. As a result, the 127-bit cycle of the second scrambling sequence 1816 is equal to the 127-bit cycle of the first scrambling sequence 1806 cyclically rotated 7 bits to the left. When M is defined as a size of CTS Data excluding foremost 7 bits of 0000000, the sequence C-SC is equal to eighth through (8+M−1)-th bits (R-SC[7] through R-SC[7+M−1]) of the sequence R-SC. That is, $$\forall x=0 \ldots M1: \text{CSC}\ [x]=\text{RSC}[x+7] \qquad \text{Equation 3}$$

where C-SC[i] is the $i^{th}$ bit of the C-SC, M is the length of the C-SC and is seven or more less than a length of R-SC, R-SC[i] is the $j^{th}$ bit of the R-SC, and the bits in C-SC and R-SC are numbered starting at 0. When M is greater than seven less than length of R-SC, the more general relationship of Equation 2 applies, wherein SC1 is the C-SC and SC2 is the R-SC.

In an embodiment, the CTS Data includes 9 bits of the Service field excluding a 7-bit Scrambler Initialization subfield, a 16-bit Frame Control field, a 16-bit Duration field, a 48-bit RA field, and a 32-bit FCS field, and therefore M is equal to 121 (i.e., equal to 9+16+16+48+32).

The station performs a bitwise exclusive-or of the second scrambling sequence 1816 with a CTS Data 1812 to generate a CTS scrambled data 1818. The station then transmits the CTS frame including the CTS scrambled data 1818 as a response to the MU-RTS frame. The CTS frame further includes 7-bit data (shown as 0000110 in FIG. 18A) which is used by the AP for generating the sequence C-SC. The 7-bit data is equal to the foremost 7 bits of the sequence R-SC.

FIG. 18B shows the respective 127-bit cycles of the first scrambling sequence 1806 (R-SC) and the second scrambling sequence 1816 (C-SC) of the example of FIG. 18A. The foremost seven bits of each scrambling sequence are underlined.

As can be seen in FIG. 18B, the second scrambling sequence 1816 (C-SC) is equal to the first scrambling sequence 1806 (R-SC) cyclically rotated 7 bits to the left, so that bits 1-120 of the second scrambling sequence 1816 (C-SC) are respectively equal to bits 8-127 of the first scrambling sequence 1806 (R-SC), and bits 121-127 of the second scrambling sequence 1816 (C-SC) are respectively equal to bits 1-7 of the first scrambling sequence 1806 (R-SC).

When all of the stations responding to an MU-RTS frame use the process 1800 of FIG. 18A to generate respective scrambling sequences for their respective responsive CTS frames, each of the CTS frames transmitted in response to the MU-RTS frame will use the same scrambling sequence.

In an embodiment, performing the RF-combined CTS transmission of FIG. 18A requires the receiver of an MU-RTS frame (the station) to get information from a received frame in the PHY layer (e.g., the MU-RTS frame) and to use that information in a subsequent frame (such as a CTS frame transmitted in response to the MU-RTS frame). In an embodiment, this is performed using parameter passing, in an RXVECTOR, information derived from the received frame by the PHY layer and sent by the PHY Layer to the MAC layer, and receiving by the PHY layer, in a TXVECTOR, information from the MAC layer for configuring the frame to be transmitted.

FIG. 19 illustrates exchanges of information between a PHY layer and a MAC layer. The left side of FIG. 19 shows the PHY layer providing RXVECTOR parameters from a received MU-RTS frame to the MAC Layer, and the right side of FIG. 19 shows the MAC layer providing TXVECTOR parameters to the PHY layer for a CTS frame to be transmitted in response to the MU-RTS frame.

FIG. 20 shows a Table 3 of TXVECTOR parameters, according to an embodiment. The bottom row of Table 3 shows a "SCRAMBLER_INITIAL_STATE" TXVECTOR parameters that is received by the PHY layer from the MAC layer and used by the PHY layer as the initial state of a scrambling sequence of a frame to be transmitted (e.g., a CTS frame).

FIG. 21 shows a Table 4 of RXVECTOR parameters for Non-HT PPDU frames, according to an embodiment. A last entry "SCRAMBLER_INITIALIZATION" is retrieved from the first 7 bits of the scrambled data of the received frame associated with the RXVECTOR and provided by the PHY layer to the MAC layer.

Subsequently, the value provided by the PHY layer to the MAC layer using the SCRAMBLER_INITIALIZATION of the RXVECTOR may be provided by the MAC layer to the PHY layer in the a parameter of a TXVECTOR of a subsequent frame to be transmitted, and may be used by the PHY layer as the initial state of a scrambling sequence for an RF-combined frame (e.g. a CTS frame).

FIG. 22 shows a Table 5 of RXVECTOR parameters, according to another embodiment. In the embodiment of Table 4, the foremost seven bits of scrambled data of the received frame associated with the RXVECTOR are communicated to the MAC layer by the PHY layer in a first seven bits of an existing RXVECTOR SERVICE field.

Subsequently, the value provided by the PHY layer to the MAC layer using the first seven bits of the RXVECTOR SERVICE field may be provided by the MAC layer to the PHY layer in the SCRAMBLER_INITIAL_STATE parameter of a TXVECTOR of a subsequent frame to be transmitted, and may be used by the PHY layer as the initial state of a scrambling sequence for an RF-combined CTS frame.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of another future amendment of IEEE 802.11.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method performed by a wireless device, the method comprising:
receiving a Multi-User Request-To-Send (MU-RTS) frame including first scrambled data;

descrambling the first scrambled data included in the MU-RTS frame using a first scrambling sequence;

generating second scrambled data by scrambling data for a clear to send (CTS) frame using a second scrambling sequence; and transmitting the CTS frame in response to receiving the MU-RTS frame, the CTS frame including the second scrambled data, wherein for each $i^{th}$ bit SS[i] of the second scrambling sequence, i=0 ... M−1, SS[i] is equal to FS[(i+K) modulo L], where FS[j] is a $j^{th}$ bit of the first scrambling sequence, K being a fixed integer greater than 1, M being equal to a size of the second scrambled data, and L being a repetitive length of the first scrambling sequence.

2. The method of claim 1, wherein the MU-RTS frame further includes first data immediately followed by the first scrambled data, and the method further comprising:

generating the first scrambling sequence based on the first data.

3. The method of claim 2, wherein a size of the first data is equal to 7 bits.

4. The method of claim 1, wherein the CTS frame further includes second data immediately followed by the second scrambled data, wherein the second data is equal to foremost 7 bits of the first scrambling sequence.

5. The method of claim 1, wherein L is equal to 2 to the $K^{th}$ power minus 1.

6. The method of claim 5, wherein K is equal to 7.

7. The method of claim 1, wherein the MU-RTS frame further includes first data immediately followed by the first scrambled data, and the method further comprising:

generating the second scrambling sequence based on the first data.

8. The method of claim 7, wherein generating the second scrambling sequence comprises:

generating the second scrambling sequence by using the first data as an initial state of a scrambler for scrambling the data for the CTS frame.

9. The method of claim 8, further comprising:

providing, by a Physical (PHY) layer of the wireless device, the first data to a Medium Access Control (MAC) layer of the wireless device.

10. The method of claim 9, further comprising:

providing, by a PHY layer of the wireless device, the first data to the MAC layer of the wireless device as a parameter of an receive vector (RXVECTOR).

11. The method of claim 10, wherein the first data correspond to a value of a scrambler initialization field in a Service field of the received MU-RTS frame prior to descrambling.

12. The method of claim 9, wherein generating the second scrambling sequence comprises:

determining, by the PHY layer of the wireless device, whether the PHY layer receives an initial state value from the MAC layer of the wireless device; and generating, by the PHY layer of the wireless device, the second scrambling sequence by using the initial state value as the initial state of a scrambler, in response to determining that the PHY layer receives the initial state value from the MAC layer of the wireless device.

13. The method of claim 12, wherein generating the second scrambling sequence further comprises:

generating, by the PHY layer of the wireless device, the initial state value, in response to determining that the PHY layer does not receive the initial state value from the MAC layer of the wireless device.

14. The method of claim 12, further comprising:

receiving, by the PHY layer of the wireless device, the initial state value from the MAC layer of the wireless device as a parameter of a transmission vector (TXVECTOR).

15. A method performed by a wireless device, the method comprising:

generating first scrambled data by scrambling data for a Multi-User Request-To-Send (MU-RTS) frame using a first scrambling sequence;

transmitting the MU-RTS frame, the MU-RTS frame including the first scrambled data;

receiving a CTS frame transmitted in response to the MU-RTS frame; and descrambling second scrambled data included in the clear to send (CTS) frame using a second scrambling sequence, wherein for each $i^{th}$ bit SS[i] of the second scrambling sequence, i=0 ... M−1, SS[i] is equal to FS[(i+K) modulo L], where FS[j] is a $j^{th}$ bit of the first scrambling sequence, K being a fixed integer greater than 1, M being equal to a size of the second scrambled data, and L being a repetitive length of the first scrambling sequence.

16. The method of claim 15, wherein the MU-RTS frame further includes first data immediately followed by the first scrambled data.

17. The method of claim 16, wherein a size of the first data is equal to 7 bits.

18. The method of claim 17, further comprising:

generating the second scrambling sequence based on the first data.

19. The method of claim 15, wherein the CTS frame further includes second data immediately followed by the second scrambled data, wherein the second data is equal to foremost 7 bits of the first scrambling sequence.

20. The method of claim 15, wherein L is equal to 2 to the $K^{th}$ power minus 1, and K is equal to 7.

* * * * *